US005299298A

United States Patent [19]
Elmquist et al.

[11] Patent Number: 5,299,298
[45] Date of Patent: Mar. 29, 1994

[54] ACCELERATED SHADOW TESTING METHOD FOR THREE DIMENSIONAL GRAPHICS RENDERING SYSTEM

[75] Inventors: Kells A. Elmquist, Lansing; David W. Arsenault, Ithaca, both of N.Y.

[73] Assignee: Hewlett-Packard Company, Palo Alto, Calif.

[21] Appl. No.: 662,159

[22] Filed: Feb. 28, 1991

[51] Int. Cl.$^5$ .............................................. G06F 15/72
[52] U.S. Cl. .................................... 395/121; 395/126; 395/127
[58] Field of Search ............... 395/121, 126, 123, 127, 395/122, 120; 340/729

[56] References Cited

U.S. PATENT DOCUMENTS

| | | | |
|---|---|---|---|
| 4,625,289 | 11/1986 | Rockwood | 395/122 |
| 4,897,806 | 1/1990 | Cook et al. | 395/126 |
| 4,928,250 | 5/1990 | Greenberg et al. | 395/126 |
| 5,058,042 | 10/1991 | Hanna et al. | 395/127 |
| 5,083,287 | 1/1992 | Obata et al. | 395/126 |
| 5,088,054 | 2/1992 | Paris, II | 395/121 |

FOREIGN PATENT DOCUMENTS 2223384 4/1990 United Kingdom .

OTHER PUBLICATIONS

European Search Report, Application No. EP 92301211, dated 22 Sep. 1993 (2 pp.).
Goral, Cindy M. et al., "Modeling the Interaction of Light Between Diffuse Surfaces", *Computer Graphics*, vol. 18, No. 3, pp. 213-222 (Jul. 1984).
Cohen, Michael F. et al., "The Hemi-Cube: A Radiosity Solution for Complex Environments", *Siggraph Proceedings*, vol. 19, No. 3, pp. 31-40 (1985).
Greenberg, Donald P. et al., "Radiosity: A Method for Computing Global Illumination", *The Visual Computer*, vol. 2, pp. 291-297 (1986).
Cohen, Michael F. et al., "An Efficient Radiosity Approach For Realistic Image Synthesis", *IEEE CG&A*, pp. 26-35 (Mar., 1986).
Cohen, Michael F. et al., "A Progressive Refinement Approach to Fast Radiosity Image Generation", *Computer Graphics*, vol. 22, No. 4, pp. 75-84 (Aug., 1988).
Maxwell, Gregory M. et al., "Calculation of the Radiation Configuration Using Ray Casting", *Computer Aided Design*, vol. 18, No. 7, pp. 371-379 (Sep. 1986).
Cook, Robert L. et al., "Distributed Ray Tracing", *Computer Graphics*, vol. 18, No. 3, pp. 137-145 (Jul. 1984).
Chattopadhyay, Sudeb et al., "Bi-Directional Ray Tracing", *Proceedings of Computer Graphics 1987*, pp. 335-343 (1987).
Wallace, John R. et al., "A Ray Tracing Algorithm For Progressive Radiosity", *Computer Graphics*, vol. 23, No. 3 (pp. 315-324) (Jul. 1989).
Reeves, William T. et al., "Rendering Antialiased Shadows With Depth Maps", *Computer Graphics*, vol. 21, No. 4, pp. 283-291 (Jul., 1987).
Foley, James D. et al., "Fundamentals of Interactive Computer Graphics", Chapter 8, ISBN 0-201-14468-9, Addison-Wesley Publishing Co., 1984.
Newman, William M. et al., "Principles of Interactive Computer Graphics", Second Edition, Chapter 16, McGraw-Hill Book Company, ISBN 0-07-046338, 1979.
Rogers, David F., "Procedural Elements for Computer Graphics", Chapter 2, McGraw-Hill Book Company, ISBN 0-07-053534.5, 1985.

*Primary Examiner*—Raymond J. Bayerl
*Attorney, Agent, or Firm*—Guy J. Kelley

[57] ABSTRACT

Shadow testing of a two dimensional projection of a three dimensional scene is accelerated by superimposing the projection with a plurality of scan areas, then examining points, and edges of objects, falling within each scan area. Points are identified as potentially shadowed points if bracketed by edges of any object, and the bracketing object is identified as a potential shadower of the potentially shadowed points. Potential shadowers and potentially shadowed points undergo a series of tests to rapidly determine which, if any, of the potential shadowers are actual shadowers of each potentially shadowed point.

37 Claims, 10 Drawing Sheets

ACCELERATED SHADOW TESTING METHOD FOR THREE DIMENSIONAL GRAPHICS RENDERING SYSTEM The present invention relates generally to the area of computer graphics. More particularly, the present invention relates to an accelerated shadow testing method for use in connection with a global illumination technique for three dimensional rendering, such as radiosity and ray tracing.

BACKGROUND OF THE INVENTION

The synthesis of realistic images in three dimensional computer graphics requires the evaluation of a shading model simulating the propagation of light within a scene or environment. Synthesis of realistic shading, and hence of realistic images, requires the use of a global illumination model in which all illumination in the scene, both from direct lighting and reflected light, is taken into account. Shadowing provided by surfaces between the light sources (both direct and reflected light) must also be determined and taken into account to synthesize a realistic image. In the prior art, this process, known as shadow testing, has been time consuming since all points in the scene must be tested against all objects to determine which objects actually shadow the points.

A number of global illumination techniques for generating realistically shaded three dimensional graphics are known, the most common of which are ray tracing and radiosity. The following publications, which are incorporated herein by reference, are illustrative: Goral, Cindy M. et al. "Modeling the Interaction of Light Between Diffuse Surfaces", *Computer Graphics*, vol. 18, no. 3, pp. 213-222 (July, 1984); Cohen, Michael F. et al., "The HemiCube: A Radiosity Solution For Complex Environments", *SIGGRAPH Proceedings*, vol. 19, no. 3, pp. 31-40 (1985); Greenberg, Donald P. et al. "Radiosity: A Method For Computing Global Illumination", *The Visual Computer*, vol. 2, pp. 291-297 (1986); Cohen, Michael F. et al., "An Efficient Radiosity Approach For Realistic Image Synthesis", *IEEE CG&A*, pp. 26-35 (March, 1986); Cohen Michael F. et al., "A Progressive Refinement Approach to Fast Radiosity Image Generation", *Computer Graphics*, vol. 22, no. 4, pp. 75-84 (August, 1988). See also the following publications, incorporated herein by reference, which describe various ray tracing techniques: Maxwell, Gregory M. et al., "Calculation of the Radiation Configuration Using Ray Casting", *Computer Aided Design*, vol. 18, no. 7, pp. 371-379 (September 1986); Arvo, James, "Backward Ray Tracing", Apollo Computer, Inc. Chelmsford, Mass. (date unknown); Cook, Robert L. et al., "Distributed Ray Tracing", *Computer Graphics*, vol. 18, no. 3, pp. 137-145 (July, 1984); Chattopadhyay, Sudeb et al., "Bi-Directional Ray Tracing", *Proceedings of Computer Graphics 1987*, pp. 335-343 (1987).

In ray tracing techniques in particular, shadow testing is normally the most computationally expensive process. The reason for this is that each object in the entire environment (scene) must be tested to determine if it occludes each light source (both direct and reflected) for every ray intersection point. For scenes with complex lighting schemes, the percentage of time required for occlusion testing (i.e., shadow testing) can increase to over 80% of the total computation time. This is also true of radiosity techniques that employ ray tracing to compute the form factors employed by radiosity. See, e.g., commonly assigned co-pending U.S. application Ser. No. 088,392 filed Jul. 6, 1993, a continuation of Ser. No. 531,377 filed May 31, 1990, now abandoned entitled "Three Dimensional Computer Graphics Employing Ray Tracing to Compute Form Factors in Radiosity"; see also, Wallace, John R. et al., "A Ray Tracing Algorithm For Progressive Radiosity", *Computer Graphics*, Vol. 23, no. 3 (pp. 315-324) (July, 1989).

Attempts have been made in the prior art to reduce the time necessary for shadow testing. See, e.g., Haines, Eric A. et al., "The Light Buffer: A Shadow-Testing Accelerator", *IEEE CG&A*, pp. 6-11, September, 1986. This document discloses a method for reducing shadow testing time in ray tracing techniques by generating light buffers, each of which partition the environment with respect to an individual light source. These partition descriptions are then used during shadow testing to quickly determine a small subset of objects that may have to be tested for intersection. See also, Reeves, William T. et al., "Rendering Antialiased Shadows With Depth Maps", *Computer Graphics*, Vol. 21, no. 4, pp. 283-291 (July, 1987) which is directed to aliasing problems for shadow algorithms that use depth maps. However, the solution discussed in this document is also expensive to implement, both in terms of required processing time and required memory space.

It is therefore desirable to provide a shadow testing method that is fast and inexpensive in terms of required memory, particularly for complex scenes. It is also desirable that the method not exhibit aliases and artifacts, and that visibility determination of points within the scene be accurate to the tolerance of floating point numbers. The present invention achieves these goals.

SUMMARY OF THE INVENTION

The method of the present invention is scene adaptive and analytic, and employs a sweep algorithm to accelerate execution time. The method is scene adaptive in that it adapts to the complexity of the scene in order to achieve low execution time for a variety of scene types. The method is analytic in that it is capable of determining shadows at shade points to within the accuracy of floating point numbers. The method computes the same result as geometric ray tracing, but is considerably faster. No drop outs or missed small objects are allowed. The method employs a sweep algorithm that operates by sweeping a scan plane, comprising a plurality of scan areas, through the scene. The objective of this method is to limit the complexity of the scene and hence achieve low execution time.

The method of the present invention projects a three dimensional scene onto a two-dimensional projection plane and sweeps down the projection plane while determining visibility of shading sample points from the point of view of the center of the projection, usually a point on the light. Multiple points on the light may be used to improve penumbra capture and accuracy.

According to the invention, a method for determining visibility of points on surfaces of objects in a three dimensional scene from a point, such as a point on a light source, first comprises the step of preparing a two-dimensional projection of the objects in the scene from the common point. The two-dimensional projection includes the projection of the points on the surfaces of the objects. Next, a plurality of substantially parallel boundaries are superimposed onto the projection. The boundaries may be considered as infinitely thin planes that are orthogonal to the projection, so that there is a space between each pair of immediately adjacent boundaries. Each space defines a scan area, so that there are a plurality of scan areas superimposed onto the projection. Each scan area has a width determined by the size of the space between adjacent boundaries. A determination is then made, for each scan area, whether any edges of one projected object bracket one or more projected points on another projected object. These points are identified as potentially shadowed points, and the objects bracketing the shadowed points are identified as potential shadowers of the potentially shadowed points. Thereafter, only the potentially shadowed points are tested against only their potential shadowers to determine whether any of the potentially shadowed points are actually obscured from the common point by any of their potential shadowers. A number of different tests, described herein, are carried out for determining which, if any, of the potential shadowers are actual shadowers of the potentially shadowed points.

Thus, according to the present invention, only potentially shadowed points are tested against their potential shadowers to determine if they are obscured from the common point, and therefore visibility of projected points is determined without the need for testing all projected points against all other projected objects.

Further details of the invention are set forth herein.

DETAILED DESCRIPTION OF THE INVENTION

Figure 1:
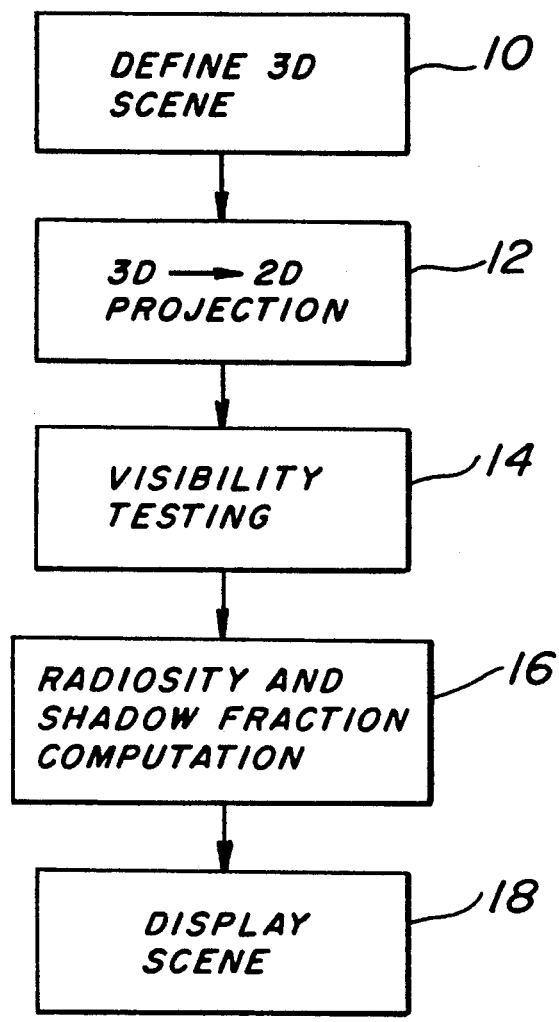
FIG. 1 is a generalized flow diagram illustrating the broad sequence of operations of the present invention.

FIG. 1 illustrates a general overview of the basic flow of the method of the present invention. A three-dimensional scene is defined, as shown at 10, then projected onto a two-dimensional plane in well known fashion, as shown at 12. Visibility testing of "shade points" on the two-dimensional projection (i.e., the points on the surfaces of the objects in the three dimensional scene that have been projected onto the two-dimensional plane) are performed, as shown at step 14. Shade points are obtained by discretizing the objects in the three dimensional scene. The vertices of the discretized objects are used as the shade points to capture the shading and shadowing of the scene. Next, radiosity and shadow fraction computations are performed, as shown at step 16, using the results of step 14. Finally, the scene is displayed on a CRT associated with the graphics renderer, as shown at 18.

The method of the present invention is for particular use in performing step 14, i.e., the step of determining the visibility of shade points in the two-dimensional projection from a common point, such as a point on a light source illuminating the scene.

FIGS. 2 through 7 are provided for the purpose of illustrating the basic concepts of the present invention. These figures illustrate application of the invention in connection with a very simple scene having only two objects, but it should be understood that this simple scene is provided for purposes of explanation only, and that the invention has application to all scenes, regardless of their complexity.

Figure 2:
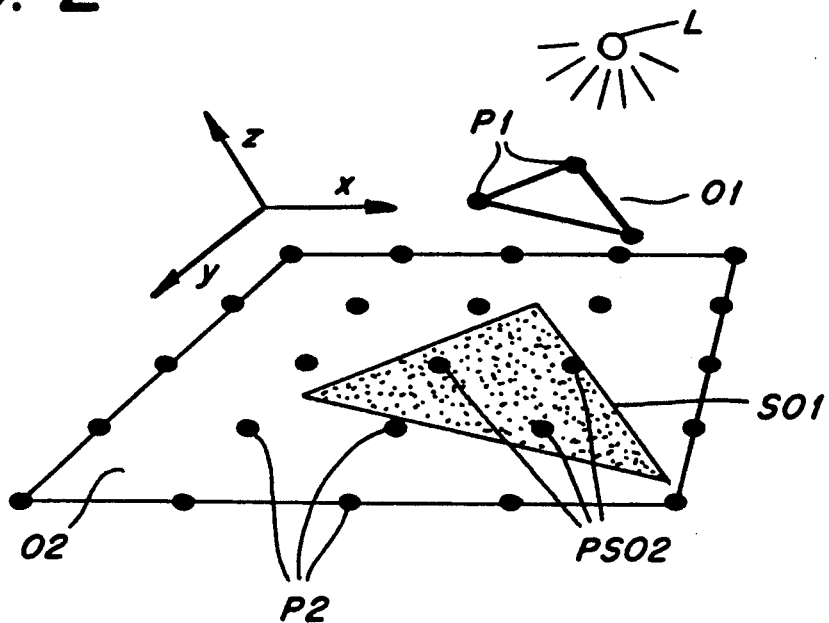
FIG. 2 conceptually illustrates a three-dimensional scene to be rendered.

Referring to FIG. 2, there is illustrated a simple three dimensional scene with two objects, 01 and 02, illuminated by a light source L. As shown, object 01 is disposed between the light source L and object 02 so that a shadow S01 of object 01 appears on object 02.

Object 01 is covered with a mesh of three shade points P1, while object 02 is covered with a mesh of 25 shade points P2. Note that the shade points are disposed at each vertex of objects 01 and 02, as well as along the edges of object 02. As shown, some of the shade points PS02 on object 02 are in the shadow of object 01, and therefore are obscured from the light source L by object 01 (i.e., they are shadowed by object 01). The purpose of the method of the instant invention is to quickly determine the identity of the points PS02, i.e., to determine whether each shade point is in the shadow of the light L or is visible to the light L without shadow testing every shade point against every object in the scene.

Figure 3:
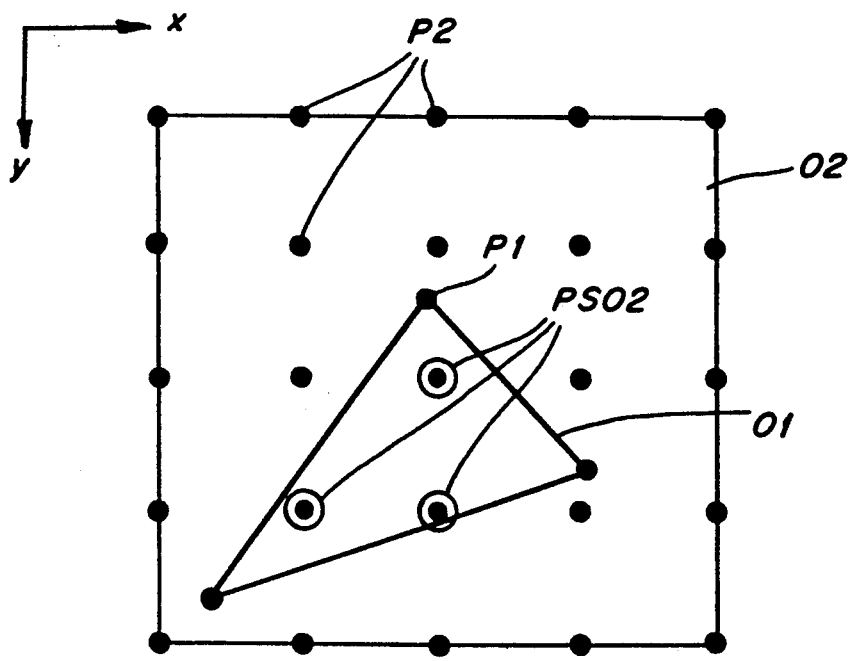
FIG. 3 conceptually illustrates a two-dimensional projection of the three-dimensional scene of FIG. 2.

As is common in three-dimensional computer graphics rendering, the three-dimensional scene of FIG. 2 is projected onto two dimensions, as shown in FIG. 3. The principles of performing three dimensional to two-dimensional projection are well known. See, for example, Foley, James D. et al., "Fundamental of Interactive Computer Graphics", Chapter 8, ISBN 0-201-14468-9, Addison-Wesley Publishing Co. Thus, FIG. 3 illustrates the same scene as FIG. 2, but from the point of the view of the light source L. According to a preferred practice of the invention, the field of view of the projection of FIG. 3 is limited to roughly 120 degrees since, for very wide views, the perspective compression is quite large toward the center of the scene. If a view larger than this maximum is required, as is common for 180 degree area lights, two half-size passes of the method described herein may be performed.

Figure 4:
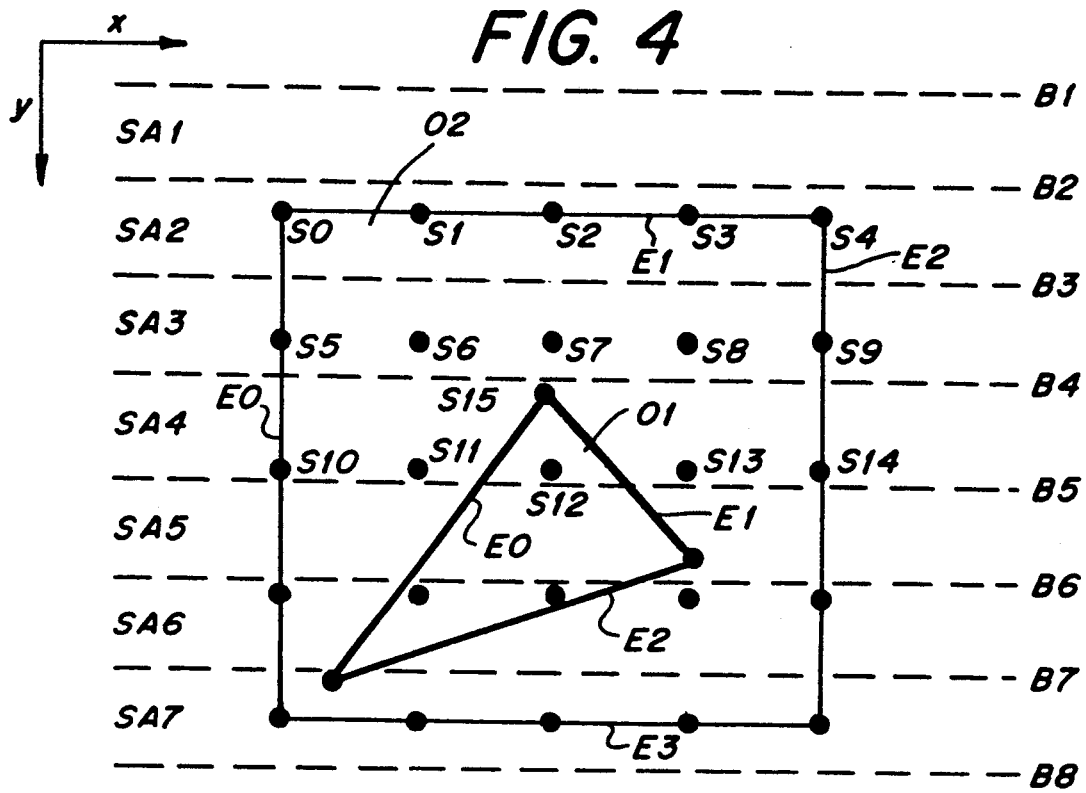
FIG. 4 illustrates the two-dimensional projection of FIG. 3 with scan areas SA1 through SA7 superimposed thereover.

As shown in FIG. 4, the two-dimensional projection has been superimposed with a plurality of spaced, parallel boundary lines B1-B8. These boundary lines may be thought of as infinitely thin planes that orthogonally intersect the two dimensional projection. Boundary lines B1-B8 define a plurality of scan areas SA1 through SA7 superimposed over the projection. Each scan area has a width defined by the y coordinate of adjacent boundaries B. The purpose of this step is to limit the number of shade point/object tests required to effect shadow testing. As shown in FIG. 4, each of the shade points in the projection has been denominated S0, S1, etc.; each edge of object 02 has been denominated E0, E1, E2, E3 while the edge of each object 01 has been denominated E0, E1, E2. It will be seen that each of the shade points and edges are disposed within ones of the scan areas. For purposes of simplicity in describing FIGS. 4 et seq. and the method of the present invention, the projection of objects 01 and 02 may be referred to herein simply as "objects"; for example, although it is the projection of object 01 that falls within scan areas SA4–SA7, the discussion below may refer to the "object" in these scan areas.

As will be appreciated hereinafter, the scan areas are sequentially traversed and scanned for the purpose of determining which shade points S0, S1, etc. are not obscured from the light source.

In the prior art, it is known to employ a process called "scan conversion" to determine visibility of solid areas in a scene. See, for example: Newman, William M. et al. "Principles of Interactive Computer Graphics", Second Edition, Chapter 16, McGraw-Hill Book Company, ISBN 0-07-046338-7; and, Rogers, David F., "Procedural Elements For Computer Graphics", Chapter 2, McGraw-Hill Book Company, ISBN 0-07-053534.5. According to the prior art scan conversion method, a plurality of infinitely thin "scan lines" are superimposed over the two dimensional projection of a scene, and the scan lines are traversed and scanned in order to determine the visibility of each projected object encountered during scanning. However, in prior art techniques, the scan lines are generally used for display purposes, i.e., they are not used for purposes of computing shadows. Since prior art scan lines have no area, use of them to compute shadows could be problematic since only objects intersected by scan lines would be considered. Thus, shadow computation using this prior art technique could be lengthy since a very large number of scan lines may be required for accuracy, and aliasing and artifacts may result since objects falling between the scan lines would not be processed. According to the present invention, however, the areas between the scan lines, rather than the scan lines themselves, are scanned for the purpose of carrying out the invention. In FIG. 4, these areas are the scan areas SA1–SA7. Thus, this aspect of the invention alone represents a substantial departure from the prior art.

Figure 5:
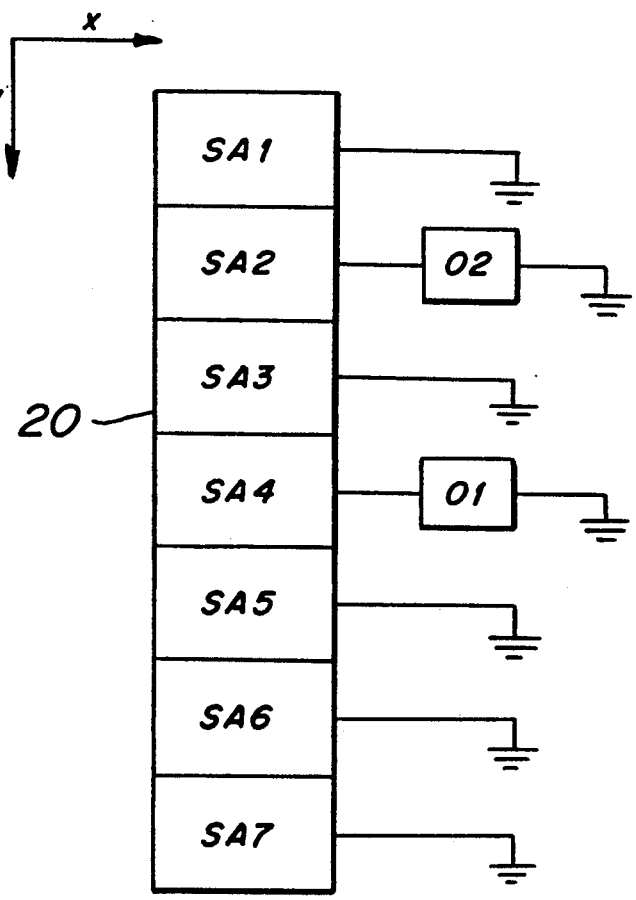
FIG. 5 conceptually illustrates a register, referred to herein as "the list of object activation buckets" for use in connection with the present invention.

After the three-dimensional scene has been defined (FIG. 1), projected into two-dimensions (FIG. 3), and superimposed with a plurality of scan areas (FIG. 4), the scene is ready for processing in accordance with the following additional principles of the present invention. As shown in FIG. 5, a register 20, referred to herein as "the list of object activation buckets" is established. The register has a plurality of memory locations, with memory locations corresponding to each of the scan areas SA1 through SA7. As each scan area, SA1 through SA7 is scanned, the identification of newly encountered objects is stored in the memory location of the register 20 corresponding to the scan area in which the object is first encountered. Thus, as shown, object activation bucket SA1 is empty, since no objects are encountered during a scan of that scan area. Object 02 is first encountered during a scan of scan area SA2, so its identity is stored in object activation bucket SA2 of the register 20. No new objects are encountered during a scan of scan area SA3, so object activation bucket SA3 of register 20 is empty. Finally, object 01 is first encountered during a scan of scan area SA4, so the identity of object 01 is stored in object activation bucket SA4 register 20. All remaining object activation buckets are empty, since no new objects are encountered during a scan of their corresponding scan areas. The contents of the register 20 are employed in a manner to be described hereinafter.

Figure 6:
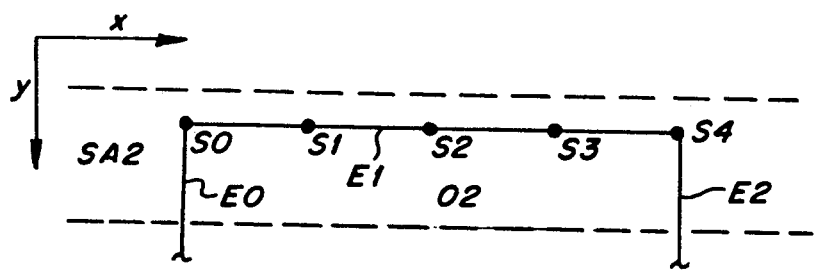
FIG. 6 illustrates details of the scan area SA2 of FIG. 4, as well as the concept of additional registers, known as the "active objects list", "active edge list", and "active shade points list", employed in connection with the present invention.
Figure 6:
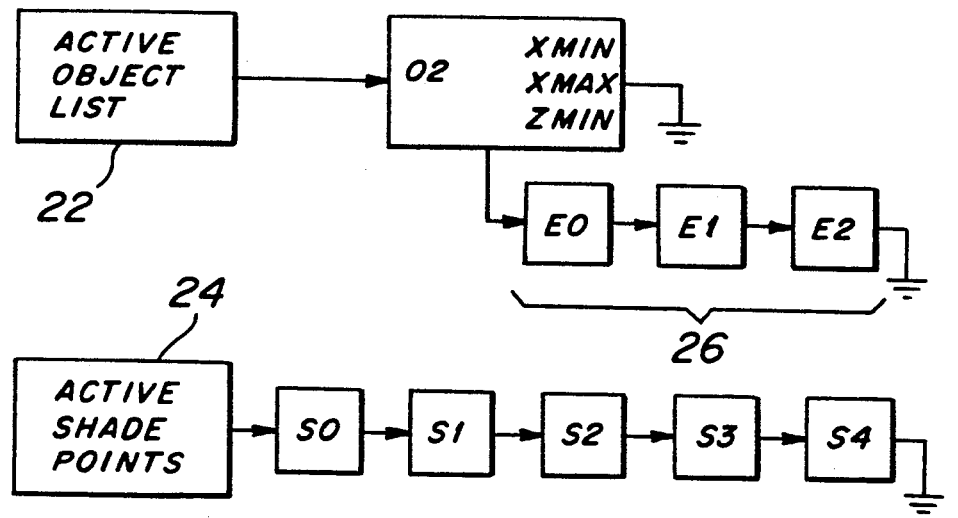

Turning to FIG. 6, it will be seen that two additional registers 22, 24, referred to herein as the "active objects list" and the "active shade points list", respectively, are employed for processing each scan area. Further, another register 26 referred to herein as the "active edges list" is also employed in processing each scan area.

FIG. 6 illustrates processing of scan area SA2, which is the scan area where object 02 was first encountered. When processing of scan area SA2 begins, the contents of the object activation bucket (FIG. 5) active objects list 22. The function of the active objects list 22 is to store the identity of all objects within the scan area currently under consideration, i.e., all "active objects" Thus, as illustrated in FIG. 6, in the case of scan area SA2, object 02, taken from the corresponding one of the object activation bucket 20 is the only active object in this scan area. As also shown in FIG. 6, an identification of the edges of each active object in the scan area under consideration is stored in the active edge list 26. Still further, certain coordinates for each active object are stored in the active objects list. As shown, the xMIN, xMAX and zMIN coordinates for each active object are stored. It will be appreciated that the xMIN coordinate corresponds to the location of edge E0 of object 02 in scan area SA2 and that the coordinate xMAX corresponds to the location of edge E2 of object 02 in scan area SA2. The third coordinate stored for each object, zMIN, indicates the point on the active object that is the closest to the light source L than any other point on that active object in three-dimensional space.

Thus, to summarize, the identity of each active object within a scan area is stored in the active objects list 22. For each active object whose identity is stored in the active objects list, the identification of the edges of that active object that fall in the scan area are also stored, as are the xMIN, xMAX and zMIN coordinates of that active object. As will be appreciated hereinafter, each active object's identity is sorted and stored in the active objects list 22 in the order in which they are encountered during scanning (i.e., according to increasing xMIN values). As will also be appreciated, the identity of objects which are no longer encountered during scanning of a scan area are removed from the active objects list 22.

The active shade points list 24 stores the identity of each shade point encountered during scanning of a scan area. As in the case of the active objects list 22, the shade points are sorted and stored in the active shade points list 24 in the order in which they are encountered during scanning. Thus, in the case of FIG. 6, it is seen that the shade points S0–S4 are stored in order.

Figure 7:
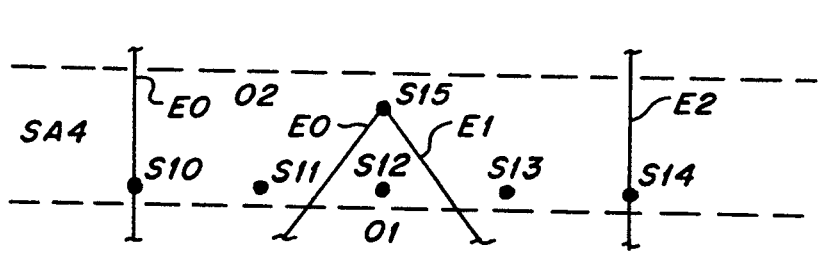
FIG. 7 illustrates further details of scan area SA4 of FIG. 4.
Figure 7:
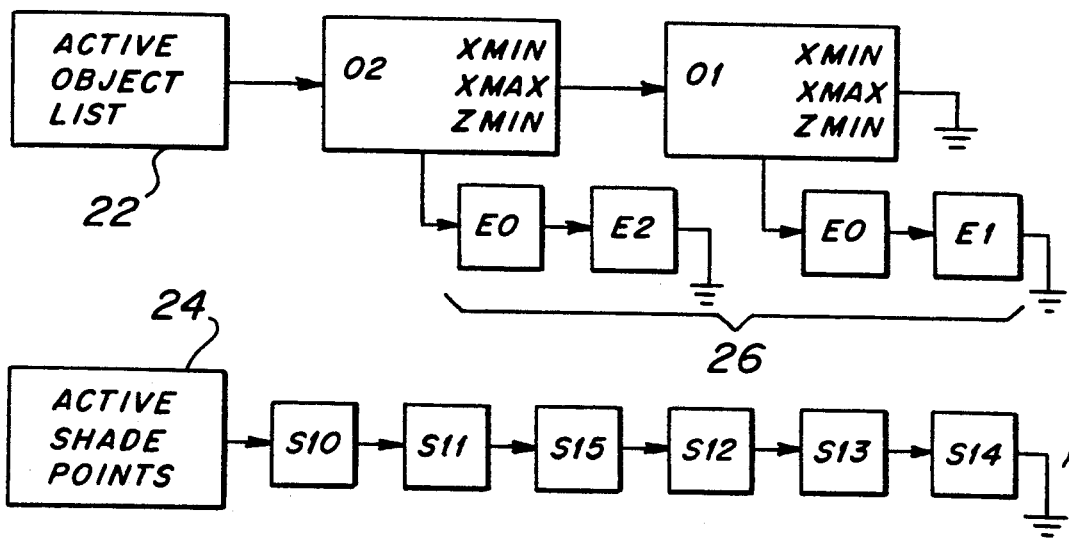

FIG. 7 illustrates the details of another scan are a, SA4, in which both objects 01 and 02 appear during scanning. From the object activation buckets 20, it is known that object 01 appears for the first time in scan area SA4. Thus, object 01 has been added to the active objects list 22, and both objects 02 and 01 are stored in the active objects list since both objects are encountered during a scan of scan area SA4. While new entries (i.e., objects) are simply appended to the active objects list 22, it should be noted that the entries are subsequently sorted in the order in which they will be encountered during scanning from left to right, i.e., in xMIN coordinate order.

Edges no longer appearing during scanning of a scan area are removed from the active edge list 26. Thus, edge E1 of object 02 has been removed from the active edge list 26. Additionally, the values of xMIN, xMAX and zMIN for each object are updated during scanning of this scan area.

The active shade points list is cleared prior to a scan of each scan area, and, as before, the identity of each shade point encountered during scanning of a new scan line is appended to the active shade points list 24; the shade points are subsequently sorted in the order in which they will be encountered during scanning, i.e., they are sorted in increasing x coodinate order. Thus, referring to FIG. 7, it is seen that the order of encounter of the shade points appearing is scan area SA4 is: S10, S11 (both on object 02), S15 (on object 01), then S12, S13 and S14 (appearing on object 02).

The manner in which the data stored in the active objects list, active edge list and active shade points list is employed in connection with the present invention will now be explained.

After a scan of a particular scan area, each shade point stored in the active shade point list 24 of that scan area is examined in turn. Each active object in the active objects list 22 for the same scan area whose xMIN and xMAX values bracket the x value of the shade point is considered to be a potential shadower of that shade point. That shade point now becomes a potentially shadowed point. In the case of FIG. 7, it will be seen that the only potential shadower for shade points S10, S11, S13 and S14 is object 02, since the x values of these shade points are bracketed by the xMIN and xMAX values of object 02. However, with respect to shade point S12 S15, both objects 01 and 02 represent potential shadowers for the same reason.

Once potential shadowers and potentially shadowed points are identified within a scan area, a number of tests are applied to reduce the number of potential shadowers of each potentially shadowed point and to find the actual shadower of each such potentially shadowed point.

In practice of the preferred embodiment of the invention, the tests described below are applied to each shade point in the order in which the shade points appear in the active shade points list 24 (after sorting in x coordinate order) for the scan area under consideration.

The first test that is applied is founded upon the knowledge that an object cannot shadow itself. Therefore any potentially shadowed points that lie on an object cannot be shadowed by the same object. Thus, this test involves simply selecting one of the potentially shadowed points, identifying the potential shadower on which the selected point is disposed, and eliminating the so-identified potential shadower as an actual shadower of that point. In the case of FIG. 7, this test eliminates object 02 from the potential shadowers of points S10, S11, S13 and S14. Since these shade points now have no potential shadowers, it has been determined that these points are in the light (i.e., not obscured). From FIG. 7, it is seen that, after application of this test, object 01 remains as a potential shadower of shade point S12 and object 02 remains as a potential shadower of shade point S15.

The next test applied to each of the potentially shadowed points is founded upon the knowledge that the z coordinate of a potentially shadowed point must be greater than the zMIN value of a potential shadower in order to be obscured by that potential shadower. In other words, shade points that are closer to the light source L than any part of a potential shadower cannot be shadowed by that potential shadower. Thus, this test involves comparing the value of the z coordinate of each potentially shadowed point to the value of the zMIN coordinate of each of its potential shadowers to determine whether or not that potential shadower can be eliminated as an actual shadower. In the case of FIG. 7, the value of the z coordinate of shade point S12 is greater than the value of the zMIN coordinate of object 01 (see FIG. 2) hence object 01 remains a potential shadower of shade point S12. However, application of this test removes object 02 as an actual shadower of point S15.

The next test that is applied is based upon the well known plane equation $Ax+By+Cz+D=0$, where A, B, C and D are constants defining the orientation and location of the plane in three dimensional space and x, y, z are the three dimensional coordinates of a point on the plane. Using the plane equation, the plane of each facet of objects in the scene are defined; the plane of the facet of each object divides the scene into two parts, the positive side and the negative side of the plane. Given the plane equation, it is a simple matter to determine which side of the plane a potentially shadowed point is disposed by using the points x, y, z in the plane equation and examining the sign of the result. For a shade point to be shadowed by a plane, the light and the point must be on opposite sides of the plane. If this is not the case, the potential shadower corresponding to the plane is eliminated as an actual shadower of the potentially shadowed point under consideration. Applying this test to point S12 and object 01 in FIG. 7, it is clear that point S12 and the light L are on opposite sides of the plane of object 01, hence object 01 remains as a potential shadower of shade point S12, i.e., object 01 cannot be eliminated as an actual shadower of shade point S12.

If, after application of all of the above tests, it still appears that a potentially shadowed point may be obscured by one or more potential shadowers, then there is only one remaining condition to prove that the point is in the shadow of a potential shadower. If, in the two dimensional projection of the scene that corresponds to the light's view, the projection of a potentially shadowed point is "inside" the projection of its potential shadower, then the point is shadowed by that potential shadower. The test for proving or disproving this condition involves defining a ray from the potentially shadowed point under consideration to a location outside of the potential shadower under consideration and determining whether the ray intersects the edges of that potential shadower an even or odd number of times. Within a scan area, only active edges need to be intersected. If the number of ray/edge intersections is odd, then the potentially shadowed point is inside of the potential shadower, and therefore in the shadow and obscured by, that potential shadower. See Section 16-2 of the above-referenced Newman et al. text entitled "Principles of Interactive Computer Graphics" for a further discussion of this test. In the case of FIG. 7, a ray defined from point S12 to any location outside of object 01 crosses only one edge. In other words, in this case, the number of ray/edge intersections is one (odd)

and therefore point S12 is in the shadow of, and obscured by, object 01.

As described above, the scan areas employed in the practice of the present invention have a width, i.e., a dimension in the y direction. Obviously, the width of each scan area will be determined by the number of scan areas chosen to superimpose the two dimensional projection of the scene. According to one practice of the invention, the total number of scan areas to be employed may be obtained by first ascertaining the total number of object surfaces in the two dimensional projection, selecting an average number of projected surfaces to be overlaid by each scan area, then dividing the total number of projected surfaces by the average number of projected surfaces to be overlaid by each scan area. The number of scan areas, and therefore the width of each scan area, is based upon the result of the division. It has been found that, when employing the invention on a Hewlett-Packard Company Model HP 9000/350 Computer, an average number of about 100 to 400 objects to be overlaid by each scan area provides acceptable results.

Another method for selecting the number of scan areas, and hence scan area width, that has been employed with success is the following. The total number of object surfaces in the projected scene is determined and divided by a first predetermined quantity to arrive at a first estimate of the number of scan areas to be superimposed onto the projection. The total number of shade points in the projection is also determined and divided by a second predetermined quantity to arrive at a second estimate of the number of scan areas to be superimposed onto the projection. Whichever one of the first or second estimates has the greatest magnitude is the number of scan areas to be superimposed onto the scene. It has been found that when the method of the present invention is implemented on a Hewlett-Packard Company Model HP 9000/350 computer, a suitable value for the first predetermined quantity is about 200, and a suitable value for the second predetermined quantity is about 40.

One of the problems with the above two methods for selecting scan area number and width is that, depending upon the distribution of the shade points and surfaces of objects in the scene, some scan areas may have only a few points and surfaces whereas others may have many. The computational time for processing each scan area therefore, may vary greatly, but it is desirable for the computational time for each scan area to be as constant as possible. The following methods for selecting scan area number and width have been found to provide successful solutions to this problem.

Figure 10:
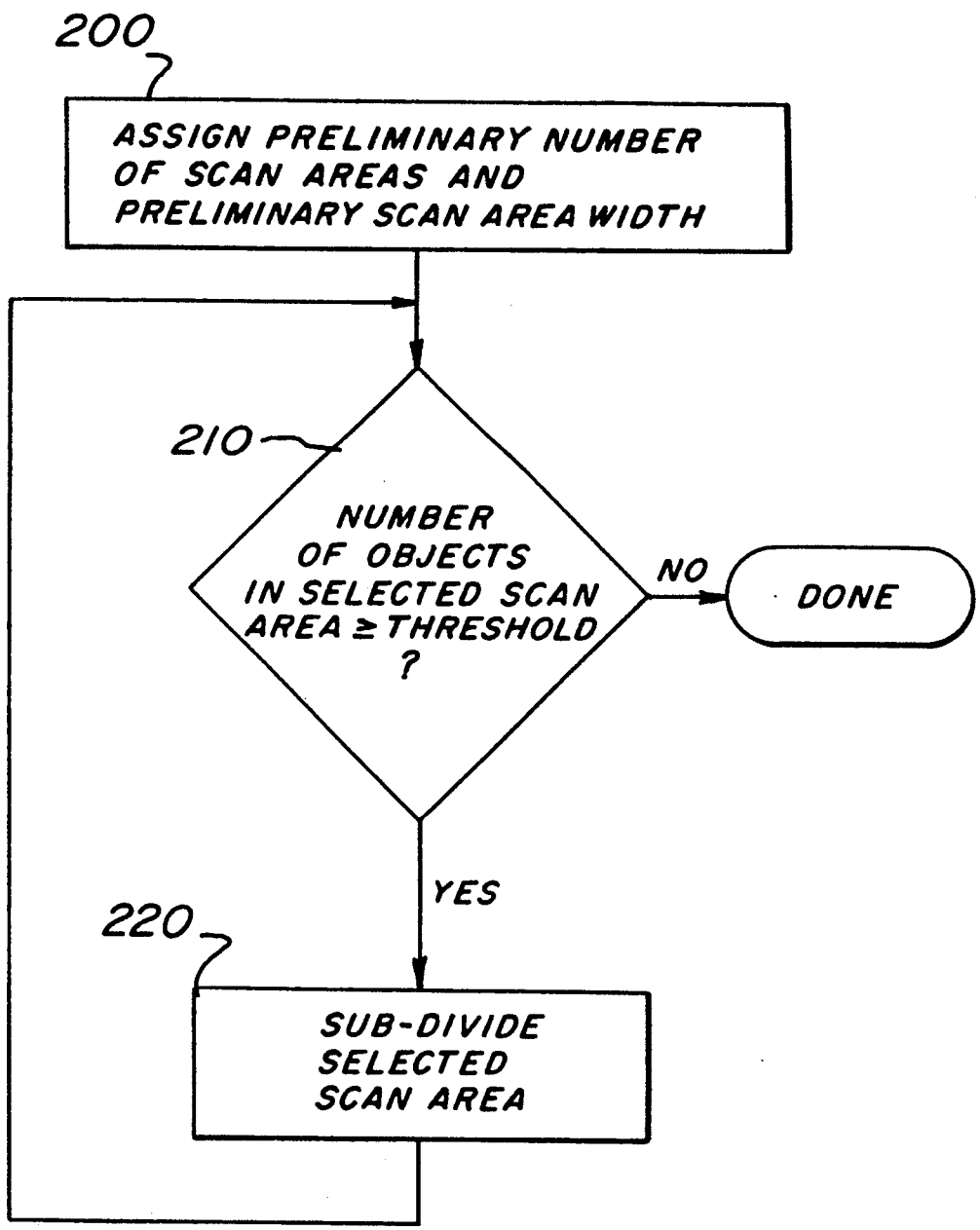
FIG. 10 illustrates one method for selecting a number and width of scan areas to be superimposed Onto the projection of the scene according to one embodiment of the invention.

According to a first improved method illustrated in FIG. 10, a preliminary number of scan areas, each of a preliminary width, is assigned and superimposed over the two dimensional projection, as shown at 200. Then, as scan areas are processed, the total number of object surfaces within each scan area is compared to a threshold value, as shown at 210. If the number of object surfaces within a scan area exceeds the threshold value, then that scan area is divided into a plurality of smaller scan areas of smaller width, and the process is repeated until the number of object surfaces within each scan area of smaller width is below the threshold value, as shown at 220. It has been found that when the method of the present invention is practiced on a Hewlett-Packard Company Model HP 9000/350 Computer System, preliminarily assigning about 50 scan areas, and setting the threshold value at about 200, provides acceptable results.

Figure 11:
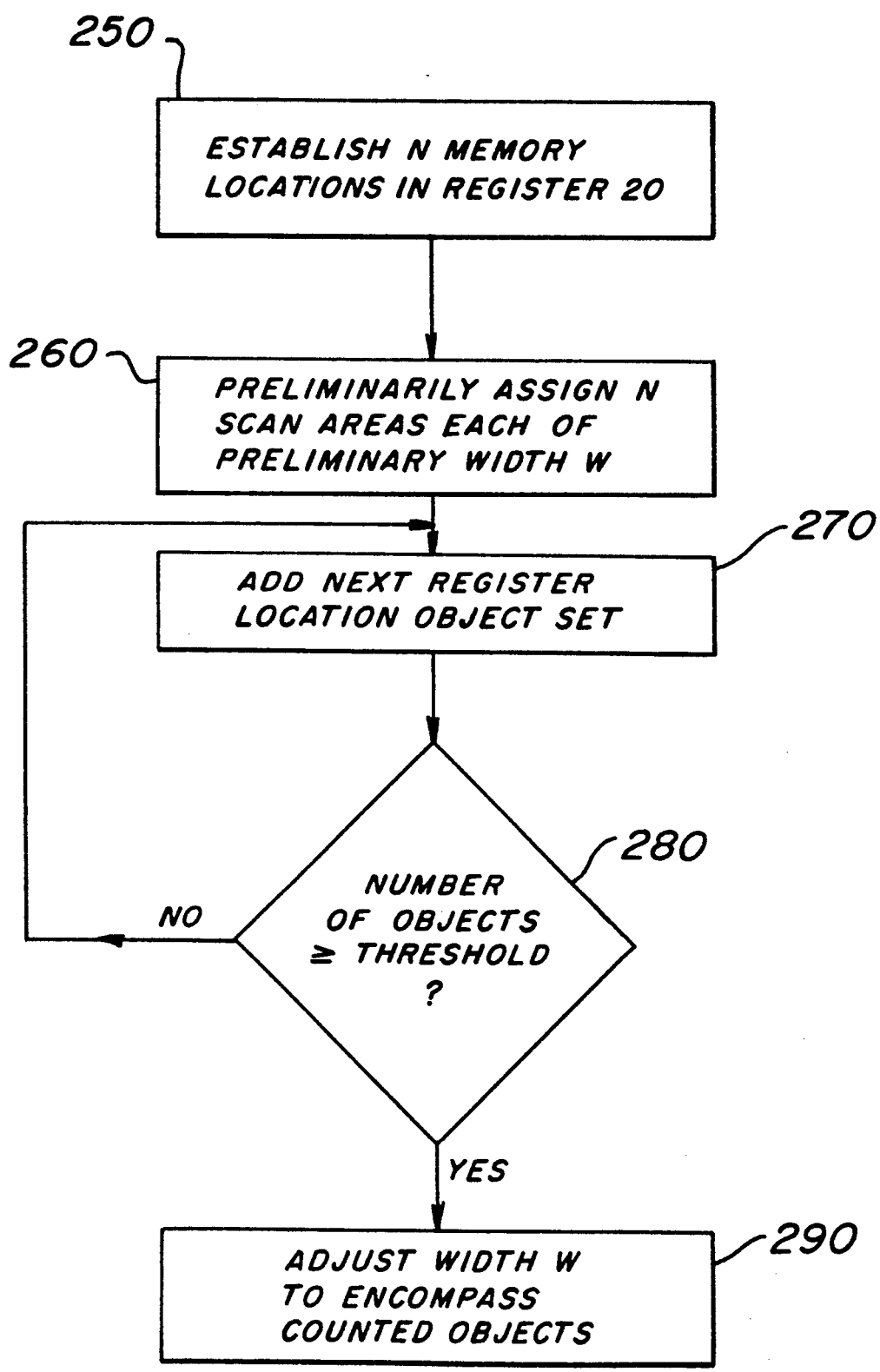
FIG. 11 illustrates another method for selecting a number and width of scan areas to be superimposed onto the projection of the scene according to another embodiment of the invention.

The most preferred method for selecting scan area and width according to the present invention is illustrated in FIG. 11. A large number of memory locations is established in the register 20 irrespective of scene complexity, as shown at 250. An equal number of scan areas, each of a preliminary width, is preliminarily assigned to be superimposed over the projection, as shown at 260. Objects are scanned and entered into the object activation list 20 corresponding to the scan area where the object is first encountered. As the scan areas are scanned, and new objects are encountered during scanning of each scan area, the identification of each newly encountered object is added to the active object list, as shown at 270. A count is maintained of the total number of object identifications stored in the object activation list 20 and, as shown at 280 and 290, when the count reaches a threshold, the boundaries of the scan areas are adjusted to define a new single scan area having a width greater than the preliminary width that overlays all of the objects whose identifications were counted to reach the threshold. This process is repeated for all subsequent scan areas so that the end result is a number of scan areas having varying width but each (except possibly the last) having a substantially equal number of objects therein. It has been found that when the method of the present invention is practiced on a Hewlett-Packard Company Model HP 9000/350 Computer, assigning about 10,000 memory locations to the object activation list 20 and setting the threshold at about 200 provides acceptable results.

Figure 8A:
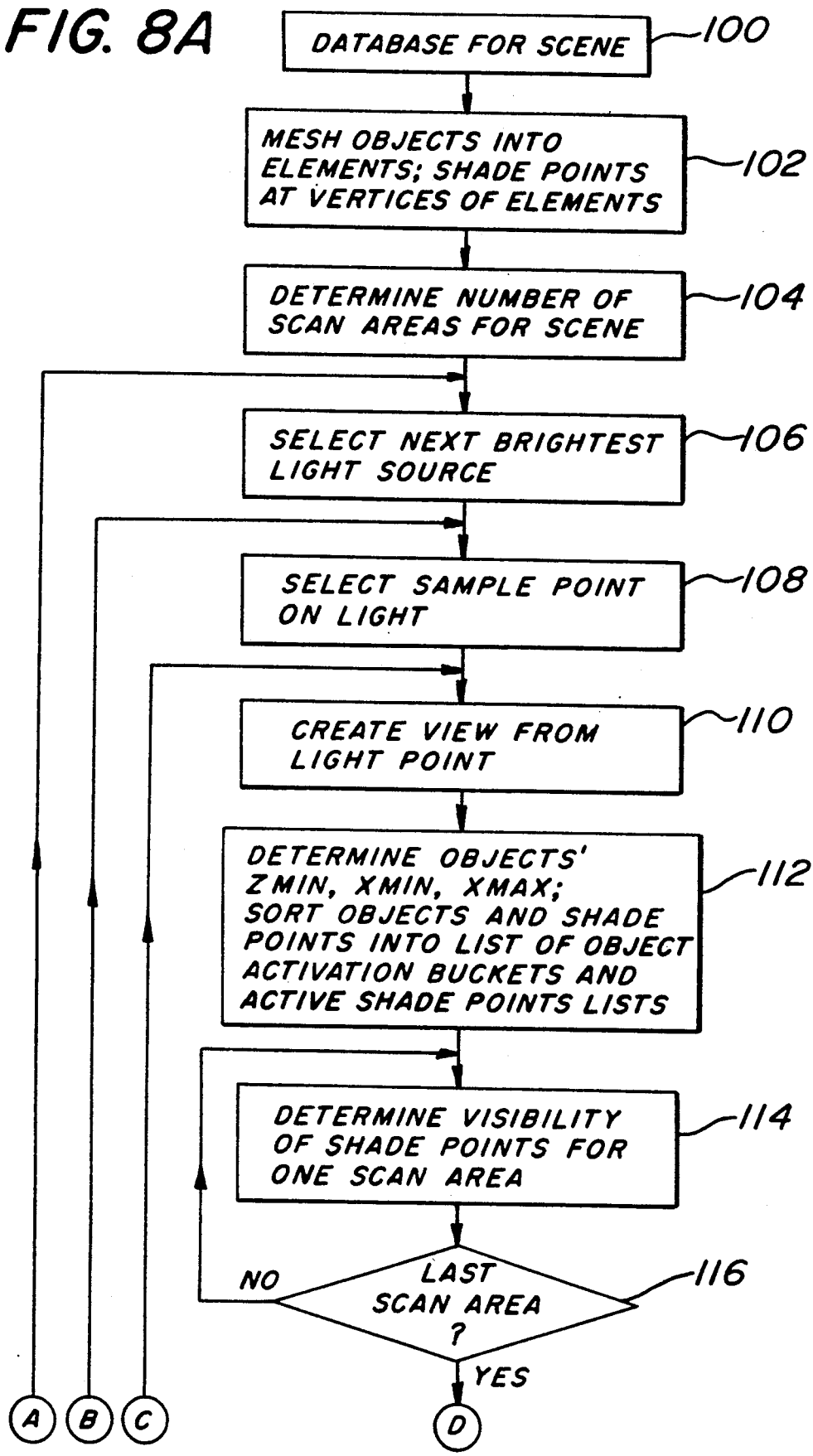
FIGS. 8A, 8B, 9A and 9B are a flowchart illustrating one preferred practice of the method of the present invention.
Figure 8B:
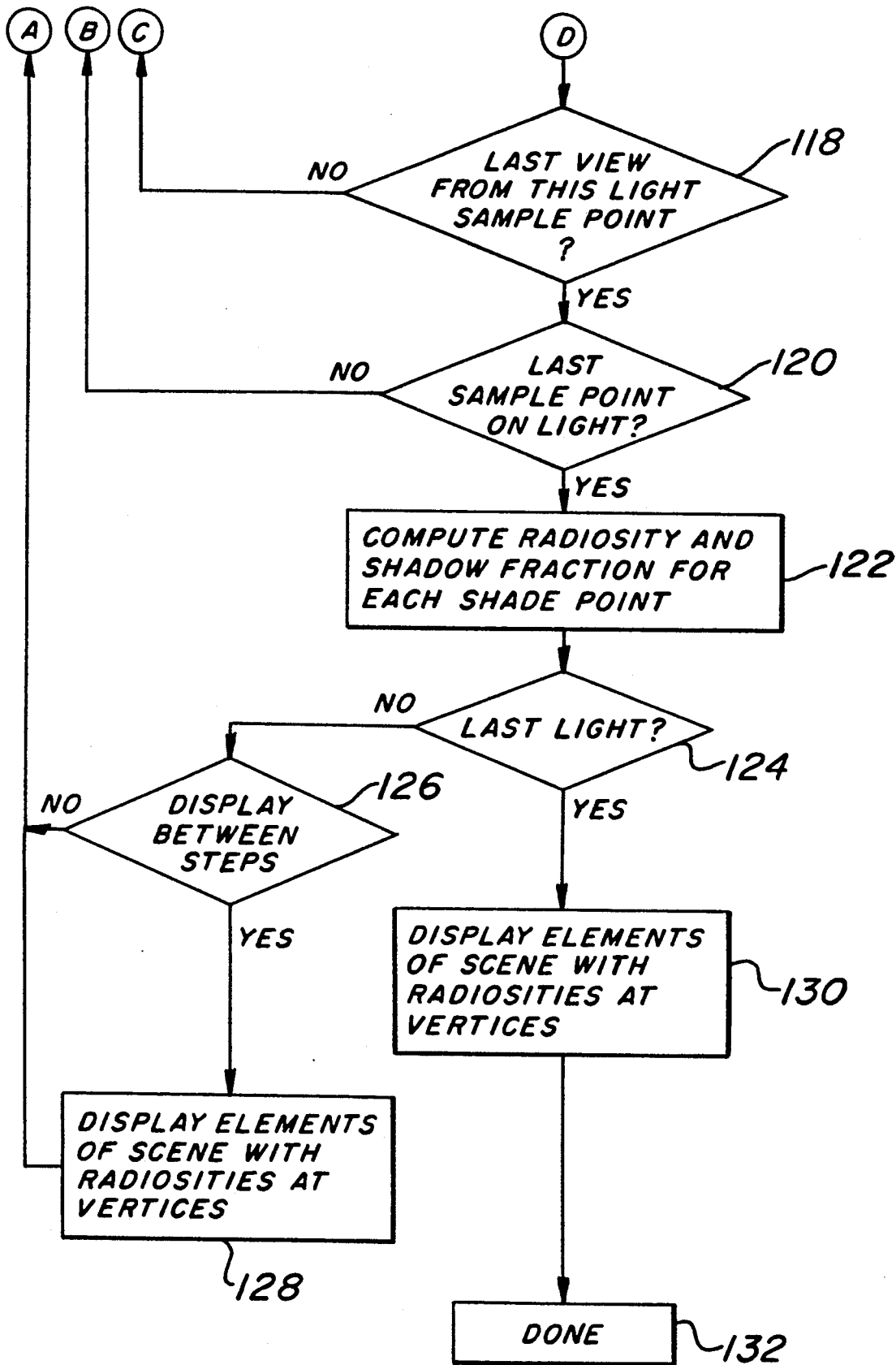

The flowcharts of FIGS. 8A and 8B further illustrate the method of the present invention. The flowcharts of FIGS. 9A and 9B set forth steps 114 and 116 of FIGS. 8A and 8B in greater detail.

Turning now to FIG. 8A, the database for the scene is defined and created in well known fashion as shown at step 100. As shown at step 102, primary elements (such as polygons) are defined for each object in the scene in well known fashion, and shade points are defined at the vertices of each element, also in well known fashion. At step 104, the number of scan areas to be superimposed onto the scene is determined using one of the methods described above. During the first pass through the flowchart, the brightest light source illuminating the scene is selected, then, during each subsequent pass, each next brightest light source is selected, as shown at step 106.

For each light source, a number of sample points are defined in well known fashion, and one of the sample points is selected, as shown at point 108. As shown at step 110, the two dimensional projection of the scene from the view of the selected sample point is created in well known fashion. At step 112, the scan areas are superimposed over the projection, the scan areas are traversed and scanned, and each object's xMIN, xMAX and zMIN within each scan area is determined. The encountered objects are sorted, according to xMIN order in the active objects list, and the shade points are sorted in increasing x order in active shade points lists, in the manner hereinbefore described. Next, as shown at steps 114, 116 (described in greater detail in connection with FIGS. 9A and 9B), the visibility of the shade points in each scan area are determined.

If additional views from the selected sample point on the current light source are present, then steps 1110 through 116 are repeated for each additional view, as shown at step 118. If additional sample points are present on the current light source, then steps 108-118 are repeated for each additional sample point, as shown at step 120. As shown at step 122, the radiosity and shadow fraction for each shade point that has not been determined to be in shadow (i.e., not obscured) is determined. If additional light sources are present, then steps 106 through 122 are repeated for each additional light source, as shown at 124. If desired, the scene may be displayed before each new light source is selected, as shown at 126 and 128. If all light sources have been selected and the scene has been processed in the manner described above, then the final scene is displayed at step 130 and the process is completed as shown at step 132.

Figure 9A:
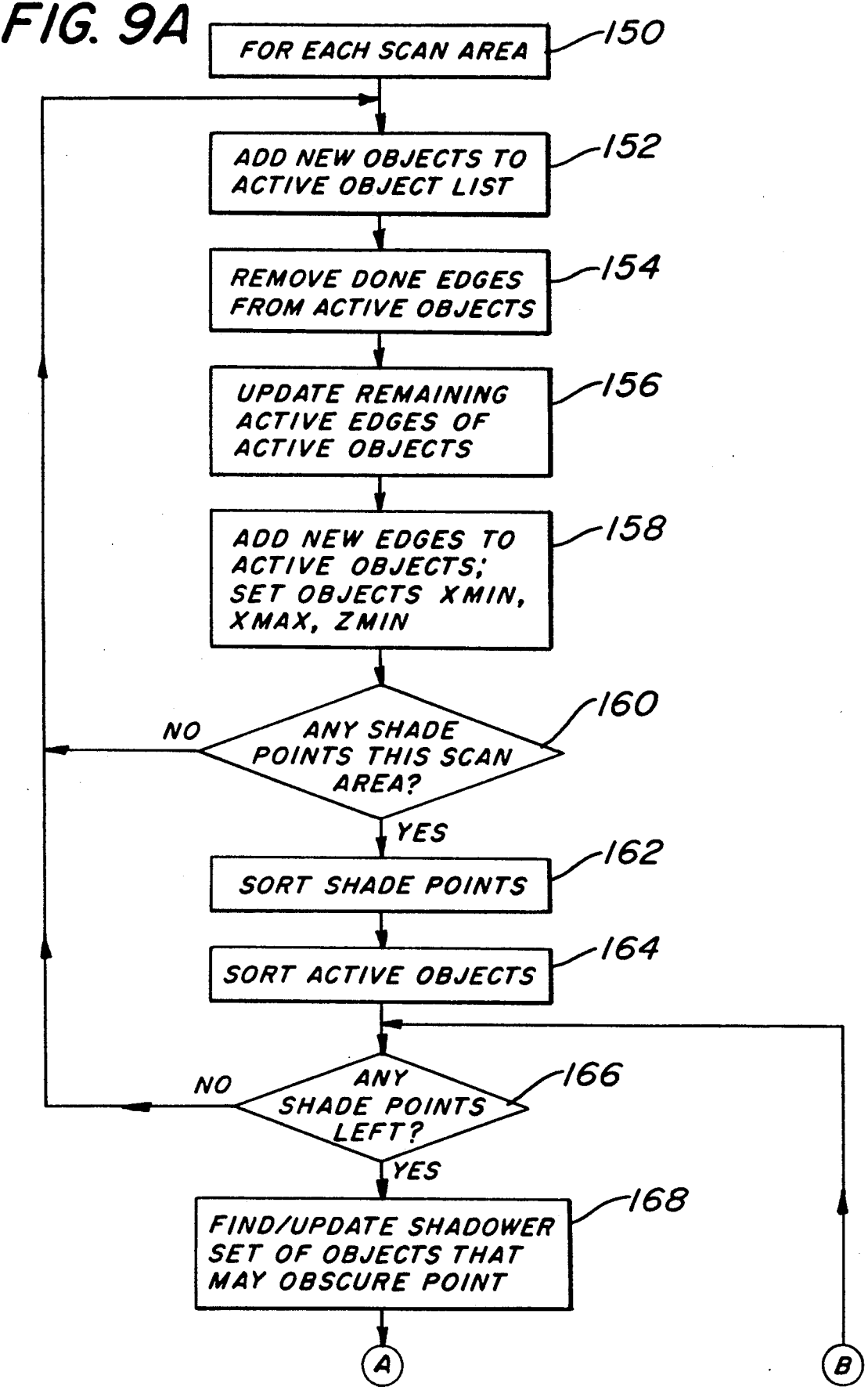
Figure 9B:
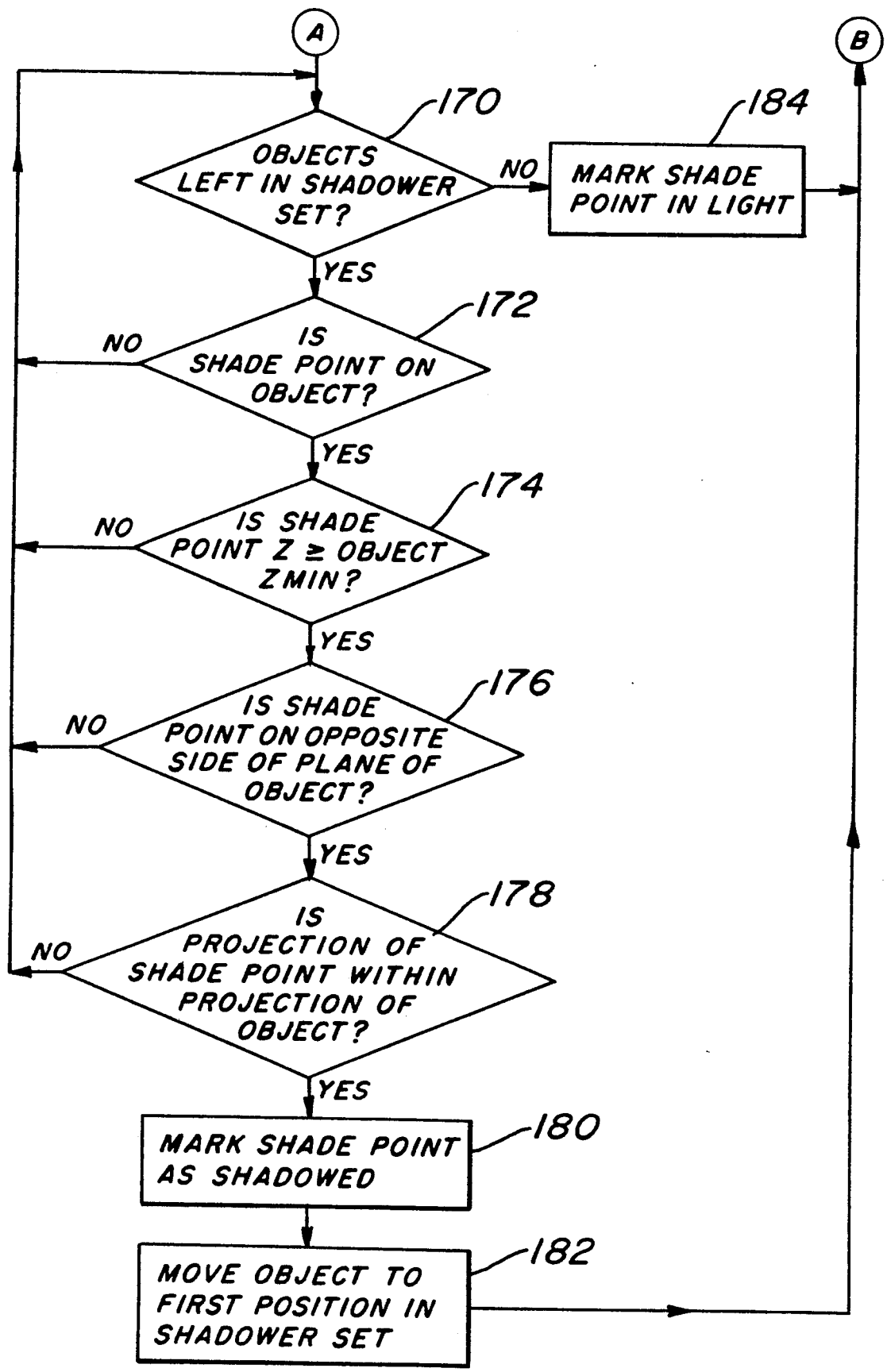

Turning now to FIGS. 9A and 9B, steps 114 and 116 will be explained in greater detail.

The flowchart of FIGS. 9A and 9B assumes that the objects have already been sorted into the memory locations of the object activation list 20. A first scan area is selected, as shown at step 150, and the active objects list 22 is updated for the selected scan area. Any edges appearing in a previous scan area but not present in the current scan area are removed from the active edge list 26, as shown at step 154. Edges appearing in the current scan area for the first time are added to the active edge list 26 as shown at 156 and 158; the xMIN, xMAX and zMIN coordinates for each object are set and stored in the active objects list 22 for the current scan area.

At step 160, a determination is made whether there are any shade points in the current scan area. If not, the next scan area in sequence is selected and steps 152 through 158 are repeated for the next scan area. If, however, there are shade points in the current scan area, then the shade points are sorted in order of their x coordinates (i.e., in increasing X value order) in the active shade points list 24. Similarly, the objects in the active objects list 22 for the current scan area are sorted according to their xMIN coordinates (i.e., in increasing xMIN value), as shown at 164. The well-known QUICKSORT algorithm is preferably employed in the performance of step 162; the well-known SHELL-SORT algorithm is preferably employed in the performance of step 164. A complete description and implementation of the QUICKSORT and SHELLSORT algorithms may be found in Sedgewick, Robert, "Algorithms", Second Edition, Addison-Wesley Publishing Co., ISBN 0-201-06673-4.

Steps 152-164 are repeated for all subsequent scan areas until, for each scan area, the active objects list (including an active edge list) and active shade points list have been created and sorted as above described, as shown at step 166. Thus, after all scan areas have been processed as above described, there will have been established, for each scan area, a sorted active objects list 22 (including a sorted active edge list 26) and a sorted active shade points list 24. After these lists have been created, steps 168 et seq. are performed.

As shown at step 168, the information stored in the active objects list and active shade point list for each scan area is examined to determine whether the edges of any objects within a scan area bracket one or more shade points within the same scan area. In other words, as shown at steps 166, 168, a determination is made whether, for a selected shade point under consideration, there is a potential shadower of the selected shade point. If there is no potential shadower for the shade point, then the shade point is marked as being visible (not obscured), as shown at steps 170 and 184, and the next shade point in sequence is selected. If, however, it was found that there are one or more potential shadowers of the selected shade point (which is now a potentially shadowed point), then steps 172 et seq. are performed for the selected shade point. At steps 172, 170, the parent of the selected shade point (i.e., the object on which the selected shade point lies) is eliminated as a potential shadower of that shade point. If, after elimination of the parent as a potential shadower of the selected shade point, there are additional potential shadowers of the select shade point, then steps 174 et seq. are performed. At step 174, any potential shadowers that do not have any portion disposed between the light source and the selected shade point are eliminated as actual shadowers of the selected shade point. This determination is made using the close/far test described above. At step 176, any potential shadowers not having a plane projection that can obscure the selected shade point are eliminated as actual shadowers of the shade point. This determination is made using the plane equation test described above. Finally, at step 178, any potential shadowers for which a ray from the selected shade point intersects active edges thereof an even number of times are eliminated as actual shadowers of the selected shade point. Any potential shadower that has survived the tests of step 172 through 178 is an actual shadower of the selected shade point, and therefore the selected shade point is marked as being in shadow (obscured from the light), as illustrated at step 180. The next shade point is selected and steps 168 et seq. are repeated, as shown at step 182.

Normally, potentially shadowed points (i.e., bracketed shade points) are selected one at a time (according to their x coordinate order in the shade point list), and tested against each of their potential shadowers. However, it is likely that an object that shadows one shade point will shadow surrounding shade points as well. This concept, known as shadow coherence, may be employed in the practice of the present invention to accelerate identification of shadowed (obscured) shade points even further. Thus, in accordance with a preferred practice of the invention, once an actual shadower of a shade point is located, subsequent shade points in the scan line are tested against that actual shadower before testing them against other potential shadowers. Any subsequent shade point that is found to be in shadow of that actual shadower need not be tested against any other potential shadowers since it has already been determined to be obscured from the light.

The following algorithm may be employed to implement the shadow coherence principle according to the present invention:

```
Sort shade point list in x order
Sort active objects in x min order
low = 0;
high = 0;
For each shade point do {
    /* find the high element in the object list */
    while (objects [high] xmin < = point x ) do {
        high = high + 1;
    /* now test each object low ... high in the
    active objects list */
    for each object i = lo through high do {
        /* check to see if this object is done, that
        is, whether the point x is greater than the
        object's xmax */
        if (objects [i] xmax < point x) then {
            /* object is done, swap object at i &
            lo */
```

```
                tmp = objects [lo]
                objects [lo] = objects [i];
                objects [i] = tmp;
                /* and move lo up, excluding done
                    object */
                lo = lo + 1;
        } else {
                /* object not done, call testers */
                hit = test object (...)
                /* this part is the shadow coherence */
                if (hit) then {
                        /* object is hit, swap object at
                            i & lo */
                        /* so hit object will be tested
                            first next time */
                        tmp = objects [lo];
                        objects [lo] = objects [i];
                        objects [i] = tmp;
                        /* since in shadowing, any shadow
                            will do, we can break the loop
                            for this point */
                        goto END POINT;
                }
        }
    }
    END_POINT:
}
```

Actual implementations of the instant method have shown it to be three to five times faster than conventional ray tracing techniques. Moreover, the method of the present invention is accurate and does not result in aliasing errors commonly associated with other global illumination techniques. And, the method of the present invention may be employed with either physically based area lights, as in radiosity, or with computer graphics point and directional lights.

Appended hereto as Exhibit A is a computer program (encoded in "C") which implements the method of the present invention for any scene. The computer program of Exhibit A does not include a global illumination computational algorithm, however, such algorithms are well known. For example, the algorithm disclosed in the aforementioned copending patent application Ser. No. 088,392 may be employed for computation of global illumination. The computer program of appendix A also does not include a database traversal algorithm, but such algorithms are generally user defined, and any suitable user defined traversal algorithm may be employed. One example of a database traversal algorithm that may be employed is disclosed in commonly assigned U.S. Pat. No. 5,058,042 filed Apr. 3, 1989 entitled "Method For Employing Hierarchical Display List in Global Rendering." Finally, not included in the computer program of Appendix A are modules that are called up by the program, but not listed; however, these modules and their implementation would be apparent to those skilled in the art once having reviewed the instant specification, including Appendix A.

The present invention may be embodied in other specific forms without departing from the spirit or essential attributes thereof and, accordingly, reference should be made to the appended claims rather than to the foregoing specification as indicating the scope of the invention.

APPENDIX A

```
../*M*********************************************************************
.**
**   MODULE NAME      :   Vertex buffer
**                        Interface File
**
**       PROJECT      :   Research90
**
**       FILENAME     :   vbuf.if
**
**       VERSION      :   %W%
**
*c       (c) COPYRIGHT    1990, 1991    3D/EYE Inc. Ithaca, NY
**                        ALL RIGHTS RESERVED
**
**********************************************************************M*/

/******** Vbuffer Command Defines *********************************/
#define    VB_INIT_ALL              (INT4)1
#define    VB_FREE_ALL              (INT4)2
#define    VB_SET_NUM_BUCKETS       (INT4)3
#define    VB_SET_PLANE_EPSILON     (INT4)4
#define    VB_INQ_STATE             (INT4)5

/********** Vbuffer configuration constants *********************/
#define    VB_DEFAULT_PLANE_EPSILON    1.0e-6
define    VB_MIN_PLANE_EPSILON        1.0e-8 define    VB_EXTRA_SHADE_PTS          (INT4)100
define    VB_EXTRA_SHADOW_OBJS        (INT4)100
#define    VB_INIT_MAX_SHADE_PTS       (INT4)200
define    VB_INIT_MAX_SHADOW_OBJS     (INT4)200 define    VB_HITHER_TO_SCENE_RATIO    0.001
define    VB_MIN_NUM_BUCKETS          (INT4)16
#define    VB_DEFAULT_NUM_BUCKETS      (INT4)100
```

```
define  VB_POOL_BLK_SZ              (INT4)32768 define  VB_LIGHT_SAMPLE_BITS        (INT4)16

/******************** Export function declarations *******************/
ifdef ANSI PUBLIC VOID _vBufferOps( INT4 op, INT4 lparam, FLT8 fparam );
PUBLIC INT4 _vBuffer( INT4 nSampPts, pOBJECT pLight );

#else
PUBLIC VOID _vBufferOps();
PUBLIC INT4 _vBuffer();

#endif

/*************************** the end ***********************************/

./*H***********************************************************************
 **
 ** MODULE NAME     :  Vertex buffer
 **                    Header File
 **
 **     PROJECT     :  Research 90
 **
 **     FILENAME    :  vbuf.h
 **
 **     VERSION     :  %W%
 **
 *c      (c) COPYRIGHT  1990, 1991      3D/EYE Inc.  Ithaca, NY
 **                     ALL RIGHTS RESERVED
 **
 ***********************************************************************H*/

/************************** VBuffer Types *****************************/

/* Object activation record, sorted by ymin in the object buckets */
typedef struct ACT_REC_T (
    struct ACT_REC_T    *pNext;
    pOBJECT             pObj; /* must be 2nd, to match p_edges below */
) ACT_REC, *pACT_REC, **ppACT_REC;

/* Once an object is activated, its shadow polys have this control record */
typedef struct SHADOW_OBJ_T (
    struct SHADOW_OBJ_T *pNext;
    struct EDGE_T       *pEdges; /* must be 2nd, to match p_obj above */
    pFLT4               pPlane;
    BOOL                ltFront;
    INT4                yEnd;
    FLT4                zMin;
    FLT4                xMin;
    FLT4                xMax;
) SHADOW_OBJ, *pSHADOW_OBJ, **ppSHADOW_OBJ;  /* 32 bytes per poly */

/* Each shadow poly has a list of edges */
/* If the edges are active, they are attached to shadow objs */
/* otherwise, they are sorted by yMin into the edge buckets */
typedef struct EDGE_T (
    struct EDGE_T       *pNext;
    pSHADOW_OBJ         pShadowObj;
    BITS4               bits;
    FLT4                xTop;
    FLT4                yTop;
    FLT4                xBot;
    FLT4                yBot;
    FLT4                curXTop;
    FLT4                curXBot;
    FLT4                dxDy;
) EDGE, *pEDGE, **ppEDGE;

/* When an object is activated, its shade pts are given this structure */
/* they are sorted into the shade buckets */
/* for each scan slab the list is sorted on xmin, using an aux array */
typedef struct SHADE_PT_T (
    struct SHADE_PT_T   *pNext;
    pBITS4              pVis;  /* indx into p_vis */
    pSHADOW_OBJ         pShadowObj;
    pFLT4               pWVtx;
    PT3                 vtx;
) SHADE_PT, *pSHADE_PT, **ppSHADE_PT;    /* 24 bytes per shadept */ define  DELETE      0x20000000
define  XINC        0x40000000
```

```
/********************* Private Vbuffer Vars ********************/
PRIVATE    INT4           _maxBucket = 0;

PRIVATE    ppACT_REC      _objectBuckets = NULL;
PRIVATE    ppEDGE         _edgeBuckets = NULL;
PRIVATE    ppSHADE_PT     _shadeBuckets = NULL;
PRIVATE    pINT4          _nShadeBuckets = NULL;

PRIVATE    INT4           _nShadowObjs = 0;
PRIVATE    INT4           _maxShadowObjs = 0;
PRIVATE    ppSHADOW_OBJ   _pShadowObjs = NULL;

PRIVATE    INT4           _nShadePts = 0;
PRIVATE    INT4           _maxShadePts = 0;
PRIVATE    ppSHADE_PT     _pShadePts = NULL;

PRIVATE    pPT4           _pXVtx = NULL;
PRIVATE    pPT4           _pClipVtx = NULL;
PRIVATE    pANY           _pTrav = NULL;
PRIVATE    INT4           _nPass = 0;

PRIVATE    FLT4           _planeEpsilon = (FLT4) VB_DEFAULT_PLANE_EPSILON ;

PRIVATE    POOLSETID      _vbPsId = 0;
PRIVATE    POOLID         _edgePool, _objPool, _actPool, _sptPool;

PRIVATE    INT4           _yMin;
PRIVATE    INT4           _yMax;
PRIVATE    PT3            _ltPt;
PRIVATE    INT4           _projType = _PERSPECTIVE;
PRIVATE    BITS4          _onBufBit;
PRIVATE    MTX4           _ltMtx;

/******************* Private Vbuffer Functions ********************/
#ifdef ANSI
PRIVATE VOID ySortObjects( VOID );
PRIVATE VOID activateObjects( INT4 line );
PRIVATE VOID addShadePts ( pOBJECT pObj, pGRAF_METH methods, BITS4 fType
              , BOOL ltFront, pSHADOW_OBJ pShadowObj, pPT4 pXVtx );
PRIVATE VOID makeEdge( REG PT3 v0, REG PT3 v1, pSHADOW_OBJ pShadowObj );
PRIVATE VOID updateEdges ( INT4  line );
PRIVATE VOID sortShadePts ( INT4  line );
PRIVATE VOID sortActiveObj ( VOID );
PRIVATE BOOL hid ( pSHADOW_OBJ pShadowObj, pSHADE_PT  pPt );
PRIVATE VOID deleteActObj ( INT4  i );
PRIVATE VOID freeShadePts( VOID );

#else
PRIVATE VOID ySortObjects();
PRIVATE VOID activateObjects();
PRIVATE VOID addShadePts ();
PRIVATE VOID makeEdge();
PRIVATE VOID updateEdges ();
PRIVATE VOID sortShadePts ();
PRIVATE VOID sortActiveObj ();
PRIVATE BOOL hid ();
PRIVATE VOID deleteActObj ();
PRIVATE VOID freeShadePts();

#endif

/********************* the end *****************************/

/*M*****************************************************************
**
**    MODULE NAME    :   Vertex buffer
**                       Implementation File
**
**       PROJECT     :   Research 90
**
**       FILENAME    :   vbuf.c
**
**       VERSION     :   $W$
**
*c     (c) COPYRIGHT  1990, 1991     3D/EYE Inc.  Ithaca, NY
**                       ALL RIGHTS RESERVED
**
*****************************************************************M*/
define        VBUF_C /* Include Files */
ifdef STATS
#include        <sys/types.h>
#include        <sys/times.h>
#include        <sys/param.h>
```

```
#undef          MIN
#undef          MAX
#undef          FLOAT
endif include        "sysbndl.if"
include        "view.if"
#include        "clip.if"
#include        "flags.if"
#include        "ltutil.if"
#include        "shading.if"
#include        "illum.if"

#include        "vbuf.if"
#include        "vbuf.h"

/*F*********************** Public Function ****************************
**
** FUNCTION NAME :    _vBufferOps
**
**      Purpose   :   vbuffer utilities
**
**      Usage     :   _vBufferOps( VB_INIT_ALL, nbuckets, hither );
**
*p----------------------------------------------------------------
** Parameters :
**              VB_SET_NUM_BUCKETS      Alloc and zero the bucket arrays
**              VB_SET_PLANE_EPSILON    Set the flatness epsilon for planes
**              VB_INIT_ALL             Init all globals & alloc
**              VB_FREE_ALL             Free all allocated memory
**              VB_INQ_STATE            Print internal state for debug
**
**      lparam  :   LONG        Number of buckets to use for vbuffers
**      fparam  :   FLOAT       Distance from eye to hither for vbufs
**
*d----------------------------------------------------------------
** Description/Algorithm :
**      This procedure provides all the utility procedures necessary to
**      use the vbuffer shadow accelerator.
**
**      The FREE_ALL utility frees all memory that previously been
**      allocated. The nbuckets & hither parameters are not used.
**
**      The SET_PLANE_EPSILON sets the minimum distance between a point and
**      a plane that might shadow it.
**
**      The SET_NUM_BUCKETS utility allows the adaption of the buckets
**      to the scene complexity. If the given nbuckets is 0, the number
**      of buckets is set to VB_DEFAULT_NUM_BUCKETS, (100). If the nbuckets
**      given is > 0, the given number will be used. Any existing bucket arrays
**      will be discarded, new bucket arrays allocated, and the arrays will
**      be zeroed. A future method could adapt the nbuckets automatically to
**      the scene complexity if given nbuckets < 0. The hither parameter is
**      not used.
**
**      The INIT_ALL utility performs all of the above operations: It frees
**      any existing memory and pools; it sets the hither as above; it sets
**      and zeros the bucket arrays as above; and it initializes other local
**      variables. The INIT_ALL utility uses all the parameters.
**
**      The INQUIRE_STATE method is only available if DEBUG has been defined,
**      and is only used for module testing. It prints the values of hither
**      and nbuckets to stdout.
**
** Exceptions :
**      If the op is not one of the above, an internal error is generated.
**
***********************************************************************F*/
PUBLIC VOID
_vBufferOps( op, lparam, fparam )
INT4    op;
INT4    lparam;
FLT8    fparam;
{
INT4    i;

switch ( (int)op ) { case VB_SET_PLANE_EPSILON :
            if ( fparam > 0.0 ) {
                _planeEpsilon = (FLT4)fparam;
            } else if ( fparam == 0.0 ) {
                _planeEpsilon = (FLT4)VB_DEFAULT_PLANE_EPSILON;
            } else {
                /* auto set the plane tolerance to 1.1 x max non flatness tolerance */
                _planeEpsilon = _pScene->maxPlaneTolerance * (FLT4)1.1 ;
```

```
          )
          /* bound at a minimum */
          mReplaceMax( _planeEpsilon,   (FLT4)VB_MIN_PLANE_EPSILON );
       break;

case VB_SET_NUM_BUCKETS :
          if ( lparam == 0 ) {
             lparam = VB_DEFAULT_NUM_BUCKETS;
          } else if ( lparam < 0 ) {
             /* auto buckets if n buckets < 0 */
             lparam = _pScene->nTotalShadePts / 200;
             i = _pScene->nGrafObj / 40 ;
             mReplaceMax( lparam, i );
          }
          mReplaceMax( lparam, (INT4)VB_MIN_NUM_BUCKETS );

if ( lparam != _maxBucket + 1 ) {
             _free ( (pANY)_objectBuckets );
             _free ( (pANY)_edgeBuckets );
             _free ( (pANY)_shadeBuckets );
             _objectBuckets = NULL ;
             _edgeBuckets = NULL ;
             _shadeBuckets = NULL ;
             _maxBucket = lparam - 1;
             _objectBuckets
                 = (ppACT_REC)_alloc( lparam * (INT4)sizeof( pACT_REC ), (INT4)VB_SYS_
             _edgeBuckets   = (ppEDGE)_alloc( lparam * sizeof( pEDGE ), (INT4)VB_SYS_
             _shadeBuckets  = (ppSHADE_PT)_alloc( lparam * (INT4)sizeof(pSHADE_PT), (
             _nShadeBuckets = (pINT4)_alloc( lparam * (INT4)sizeof(INT4), (INT4)VB_SY for ( i=0; i < lparam; ++i ) {
                _objectBuckets[ i ] = NULL;
                _edgeBuckets[ i ]   = NULL;
                _shadeBuckets[ i ]  = NULL;
                _nShadeBuckets[ i ] = 0;
             }
          }
       break;

case VB_FREE_ALL :
          /* free up anything that may have been alloc */
          _free( (pANY)_pXVtx ) ;
          _free( (pANY)_pClipVtx ) ;
          _free( (pANY)_pTrav ) ;
          _pXVtx = _pClipVtx = NULL ;
          _pTrav = NULL ;

/* free the vertex array, the bucket arrays, and the vbuffer pools */
          _free ( (pANY)_pShadePts );
          _free ( (pANY)_pShadowObjs );
          _free ( (pANY)_objectBuckets );
          _free ( (pANY)_edgeBuckets );
          _free ( (pANY)_shadeBuckets );
          _free ( (pANY)_nShadeBuckets );
          _pShadePts = NULL; _pShadowObjs = NULL; _objectBuckets = NULL;
          _edgeBuckets = NULL; _shadeBuckets = NULL; _nShadeBuckets = NULL;

_maxBucket = _maxShadePts = _maxShadowObjs = 0;

if ( _vbPsId ) _closePoolSet ( _vbPsId );
          _vbPsId = NULL;
       break;

case VB_INIT_ALL :
          /* free any existing memory */
          _vBufferOps( VB_FREE_ALL, (INT4)0, 0.0 );

/* set hither, fov to default */
          _lightViewOps( LT_SET_HITHER, 0.0 );
          _lightViewOps( LT_SET_MAX_AOV, 0.0 );

/* alloc and zero the bucket arrays */
          _vBufferOps( VB_SET_NUM_BUCKETS, lparam, 0.0 );

/* alloc the initial shade point array */
          _pShadePts = (ppSHADE_PT)_alloc((INT4)((VB_INIT_MAX_SHADE_PTS+1) * sizeof(
          _maxShadePts = VB_INIT_MAX_SHADE_PTS;

/* alloc the initial shadow object array */
          _pShadowObjs = (ppSHADOW_OBJ)_alloc((INT4)((VB_INIT_MAX_SHADOW_OBJS+1) * si
          _maxShadowObjs = VB_INIT_MAX_SHADOW_OBJS;

/* open the pool manager & pools for vbuffer use */
          _vbPsId  = _openPoolSet( (INT4)VB_POOL_BLK_SZ, VB_DATA_MGRP );
          _objPool = _newPool ( _vbPsId, (INT4)sizeof( SHADOW_OBJ ) );
```

```
                _edgePool = _newPool ( _vbPsId, (INT4)sizeof( EDGE ) );
                _sptPool  = _newPool ( _vbPsId, (INT4)sizeof( SHADE_PT ) );
                _actPool  = _newPool ( _vbPsId, (INT4)sizeof( ACT_REC ) );
            /* init temporary variables */
                mSetVec3( _ltPt, (FLT4)0.0 );
                _planeEpsilon = (FLT4)VB_DEFAULT_PLANE_EPSILON;
            break;

#ifdef DEBUG
        case VB_INQ_STATE :
            printf ("Hither = %g\n", _lightHither );
            printf ("Plane Epsilon = %g\n", _planeEpsilon );
            printf ("max angle = %g\n", _maxLightAov );
            printf ("Num Buckets = %d\n", _maxBucket + 1 );
            printf ("ShadePt Array Sz = %d\n", _maxShadePts + 1 );
            printf ("Shadow Obj Array Sz = %d\n", _maxShadowObjs + 1 );
            break;

default :
            printf ( "vBufferOps command not recognized\n" );
            break;

#endif
    }
}

/*F***************************** Public Function *****************************
**
** FUNCTION NAME :      _vBuffer
**
**     Purpose   :      vbuffer main routine, determine vtx visibility
**
*p---------------------------------------------------------------------------
** Parameters :
**          VB_SINGLE_BUFFER : If this flag is set only a single vbuf is performed
**                            regardless of the cone angle specified in p_light.
**                            If this flag is not set, and the specified cone angle
**                            is greater than can be handled by a single projection,
**                            the required separate buffers will be computed, and
**                            the results or'd into a single bit representation.U
**
**
**          light :   Id of a light .
**
**     returns : LONG : number of bits fields set as a result of the op.
**                      this info is needed to convert vis bits to fractions.
**
*d---------------------------------------------------------------------------
** Description/Algorithm :
**
**      The Vbuffer is a shadow testing accelerator for radiosity computations.
**      It pseudo-scan converts the scene from the point of view of the light,
**      or a corner of the bounding box surrounding an area light, and determines
**      the On/Off visibility for each shade point in the scene.
**
*****************************************************************************F*/
PUBLIC INT4     /* number of bit fields set in vis fields */
_vBuffer( nSampPts, pLight )
INT4      nSampPts;
pOBJECT   pLight;
{
INT4            i, j, bit, nPts, nPt, line;
FLT4            x, d, epsilon;
REG pSHADOW_OBJ pActObj;
REG pFLT4       pWcPt;
REG pFLT4       pPlane;
REG ppSHADE_PT  pPtArr;
ppSHADOW_OBJ    pObjArr;
pSHADE_PT       pPt ;
INT4            low, high, nSampPt ;
UINT4           inLightBit ;
PT2             rastSz;
MTX4            m0, m1;

INT4    nShots = 0;

#ifdef STATS
int     localTime;
struct tms      time;
    localTime = times( &time );
endif _pXVtx = (pPT4)_alloc( _pScene->nMaxVtxInObj * 2 * sizeof( PT4 ), (INT4)VB_SYS_M
    _pClipVtx = (pPT4)_alloc( _pScene->nMaxVtxInObj * 2 * sizeof( PT4 ), (INT4)VB_SY
    _pTrav = (pANY)_alloc( _travSz, (INT4)VB_SYS_MGRP );
```

```
      inLightBit = 1;
      _onBufBit = inLightBit << VB_LIGHT_SAMPLE_BITS;
      _nShadowObjs = 0;

/* >>>>>>>>>. op |= VB_SINGLE_BUFFER; */

/* for each point on the light do ... */
      for ( nSampPt = 0; nSampPt < nSampPts;  ++nSampPt ) {
         _nPass = 0;
         /* for each part of the lights view... */ while(( _projType = _lightViewMtx( m0, _ltPt, pLight, nSampPt, _nPass++ )) !=
ifdef STATS
            _nVBuf++;
endif ifdef DEBUG
            if ( _nPass > 1 ) printf( "Pass %d \n", _nPass );
#endif
            rastSz[ X ] = rastSz[Y] = (FLT4)( _maxBucket + 1 );
            _rasterMtx( m1, NULL, rastSz );
            _mtx4Mtx( _ltMtx, m0, m1 );

ySortObjects( );

for ( line = 0; line <= _maxBucket; ++line ) {
               activateObjects( line );
               updateEdges( line );

/* see if any shade pts this line */
               if ( _nShadeBuckets[ line ] > 0 ) {

/* Sort the points on the line.  Sorting may realloc
                   * the list, so assign to local here */
                  sortShadePts( line );
                  pPtArr = _pShadePts;
                  nPts = _nShadePts ;

/* Sort the objects by both xmin and xmax */
                  sortActiveObj() ;
                  pObjArr = _pShadowObjs ;
                  low = high = 0 ;

/* Now look at the points one by one */
                  for ( nPt=0; nPt < nPts; nPt++ ) {
                     pPt = pPtArr[ nPt ] ;
                     x = pPt->vtx[X];
                     /* Add any objects whose xmin is no more than xpt */
                     while (  ( high < _nShadowObjs )
                           && ( pObjArr[ high ]->xMin <= x )
                           ) high++ ;

/* Now, finally, check each current object against
                      * the current point until we determine that it is
                      * obscured.
                      */
                     for ( j = low ; j < high ; j++ ) {
                        pActObj = pObjArr[ j ];
#ifdef STATS
                        ++_nLoopCnt;
endif /* Maybe this object should depart from the list.
                         * Do this by moving a good guy up.
                         */
                        if ( pActObj->xMax <= x ) {
                           pObjArr[ j ] = pObjArr[ low ] ;
                           pObjArr[ low ] = pActObj ;
                           low++ ;

/* Otherwise, still a good object */
                        } else if(( pPt->pShadowObj != pActObj )
                              && ( pPt->vtx[Z] >= pActObj->zMin )
                              ){
                           pPlane = pActObj->pPlane;
                           epsilon = pPlane[ T ] * (FLT4)2.0;

/* find distance of original point to
                            * plane of active poly */
                           pWcPt = (pFLT4)( pPt->pWVtx );
                           d = mDot3( pWcPt, pPlane ) + pPlane[D];
                           /*********
                           d = mMin( d - epsilon, d + epsilon );
                           **********/
                           epsilon += _planeEpsilon;
```

```c
                    /* see if its beyond epsilon, on same side as eye, & Hi
                    if ( ((d >= (FLT4)0.0) != pActObj->ltFront )
                        && ( d > epsilon || -d > epsilon )
                        && hid( pActObj, pPt )
                    ){
                        /* Obscured.  Make the obscuring object first */
                        if ( j != low ) {
                            pObjArr[ j ] = pObjArr[ low ];
                            pObjArr[ low ] = pActObj ;
                        }
                        goto endShadePt;
                    }
                }

/* If we make it to here then nothing obscures the point
                 * so we can flag it. duplicates hang on pNext. */
                while ( pPt ) {
                    *(pPt->pVis) |= inLightBit ;
                    pPt = pPt->pNext ;
                }
                /* jump here if we're obscured.  Do nothing */
                endShadePt : NULL_STMT;
            } freeShadePts();
        } /* end, vertex list not empty */
    } /* end, for each line */

/* delete remaining active objects */
    while ( _nShadowObjs > 0 ) {
        deleteActObj( 0 );
    }

} /* for each pass of the light */
    inLightBit <<= 1;
    _onBufBit <<= 1;
    ++nShots;

} /* end, for each proj pt on the Light */ ifdef STATS
    _totVBufTime += times(&time) - localTime;
#endif

_free( (pANY)_pXVtx );
    _free( (pANY)_pClipVtx );
    _free( (pANY)_pTrav );
    _pXVtx = _pClipVtx = NULL ;
    _pTrav = NULL ;

return ( nShots );
}

/*f*********************** Private Function ****************************
**
** FUNCTION NAME :    ySortObjects
**
**     Purpose  :     Transform objects and bucket sort on ymin
**
*d------------------------------------------------------------------
** Description/Algorithm :
**      Transform objects point lists y & v. determine object ymin
**      & bucket sort.  If clipped by hither, activate object now.
**
*********************************************************************f*/
PRIVATE VOID
ySortObjects( )
{
REG    INT4          i, yMin, yMax;
REG    pGRAF_METH    methods;
       pINT4         pList;
       INT4          nObj, oIndx, nClip, nFacets;
       UINT4         objType, fType, vType;
       pOBJECT       pObj;
       pSHADOW_OBJ   pShadowObj;
       pPT4          pV0, pV1, pFirst;
       pFLT4         pPlane;
       pACT_REC      pActRec;
       pFLT4         pVtx, pNorm;
       BOOL          noBack ;
       INT4          inOut;
       VEC2          yRng;
       BOOL          ltFront;
```

```
REG pANY    pTrav = _pTrav;

pList = _lockList ( &nObj, _pScene->objects );

/* for each object in the scene */
    for ( oIndx = 0; oIndx < nObj; oIndx++ ) {
        pObj = (pOBJECT)(pList[ oIndx ]);
        if ( !pObj
            || ((UINT4)pObj & PTR_DEL_VAL)
            || ( (pObj->bits & CLASS_MSK) != CLASS_GRAF3D )
           )
            continue;

objType = pObj->bits & OBJ_TYPE_MSK;
        methods = (pGRAF_METH)_methods[ objType ];

(*(methods->inquireFacets))( &nFacets, &fType, pObj->pData );

if ( !(fType & _CAST_SHADOWS) && !(fType & _RCV_SHADOWS) )
            continue;

/* Initialize the quick out condition or check it, depending on pass */
        if ( _nPass == 1 )
            pObj->bits &= ~VB_ALL_IN_TAG ;
        else if ( pObj->bits & VB_ALL_IN_TAG )
            continue;

/* examine all points to see if they are behind hither */
        inOut = (*(methods->hitherTestObj))( pObj->pData, _ltMtx );
        if ( inOut == _ALL_OUT ) continue;

if ( inOut == _ALL_IN ) {
            /* all pts in, find ymin & ymax for the object in light space */
            (*(methods->yBoundObj))( yRng, pObj->pData, _ltMtx );

if ( (yMin = (INT4)yRng[MIN]) >= 0 && (INT4)yRng[MAX] <= _maxBucket ){
                /* set quick out for next time around */
                pObj->bits |= VB_ALL_IN_TAG ;
            } if ( yMin <= _maxBucket && yRng[MAX] >= (FLT4)0.0 ) {
                /* at least part in in y, create activation record */
                pActRec = (pACT_REC)_poolAlloc( _actPool );
                pActRec->pObj = pObj;

/* push the activation record in the ymin object bucket */
                if ( yMin < 0 ) yMin = 0;
#ifdef DEBUG
if ( yMin < 0 || yMin > _maxBucket )
printf( "objectBucket indx out of range\n" );
#endif
                pActRec->pNext = _objectBuckets[ yMin ];
                _objectBuckets[ yMin ] = pActRec;

} else {
                /* all out in y */
                inOut = _ALL_OUT;
            }
            continue;
        } /* all in */

/* must be some in from here to the end of the loop */
        (*(methods->transformCoord4))( _pXVtx, pObj->pData, _ltMtx );

if ( fType & _CAST_SHADOWS ) {
            /* some in, hither clip and save facets */
            (*(methods->startFacetTrav))( pTrav, pObj->pData );

/* set inOut to all out, if any facet is in, it will be reset */
            inOut = _ALL_OUT;

/* clip each facet of the object */
            while( (pPlane = (*(methods->nextFacet))(pTrav)) != (pFLT4)FAIL ){

/* single facet clipper */
                pShadowObj = (pSHADOW_OBJ)_poolAlloc( _objPool );
                pShadowObj->zMin = (FLT4)INFINITY ;
                _yMin = 999999 ; _yMax = -1 ;

nClip = _hitherClipFacet( methods, pTrav, _pClipVtx, _pXVtx );
                /* traverse clipped point list, make edges */
                pFirst = pV0 = pV1 = _pClipVtx;
                for ( i = 1; i < nClip; ++i ) {
                    ++pV1;
                    if ( (*pV1)[X] >= (FLT4)INFINITY ) {
```

```
                    /* draw closing edge */
                    makeEdge( *pV0, *pFirst, pShadowObj );
                    /* skip end outline tag, v0 = v1+1, v1 = v1+2 */
                    pFirst = pV0 = ++pV1;
                } else {
                    makeEdge( *pV0, *pV1, pShadowObj );
                    pV0 = pV1;
                }
            } if ( _yMin < 999999 ) {
                pShadowObj->yEnd   = _yMax + 1;
                pShadowObj->pPlane = pPlane;
                pShadowObj->ltFront = ( mDot3( pPlane, _ltPt ) + pPlane[D] )
                        >= (FLT4)0.0;
                pShadowObj->pEdges = NULL;
                pShadowObj->xMin = (FLT4)INFINITY;
                pShadowObj->xMax = (FLT4)NEG_INFINITY;

if ( _yMin < 0 ) _yMin = 0;
#ifdef DEBUG
if ( _yMin < 0 || _yMin > _maxBucket )
printf( "objectBucket indx out of range\n" );
#endif
                pShadowObj->pNext = (pSHADOW_OBJ)_objectBuckets[ _yMin ];
                _objectBuckets[ _yMin ] = (pACT_REC)pShadowObj;

/* reset inOut, at least one facet part in */
                inOut = _SOME_IN;

} else {
                /* entire obj above or below buffer */
                _poolFree( _objPool, (pANY)pShadowObj );
            }
        } /* for each facet */

} else {
        /* some in but casts no shadows */
        pShadowObj = NULL;
    } if ( inOut != _ALL_OUT && (fType & _RCV_SHADOWS) ) {
        /* some in and rcv shadows, activate unclipped shade points */
        if ( nFacets > 1 ) {
            pShadowObj = NULL;
            ltFront = TRUE;
        } else {
            (*(methods->startFacetTrav))( pTrav, pObj->pData );
            pPlane = (*(methods->nextFacet))( pTrav );
            ltFront = mDot3( _ltPt, pPlane ) + pPlane[D] >= (FLT4)0.0;
        }
        addShadePts ( pObj, methods, fType, ltFront, pShadowObj, _pXVtx );

} /* if some shade points in */
} /* end for each object */

_unLockList ( _pScene->objects );
}

/*f************************ Private Function ****************************
**
** FUNCTION NAME :    activateObjects
**
** Purpose    :    Transform objects, create edges & shade points
**
*d----------------------------------------------------------------------
** Description/Algorithm :
**      Transform objects point lists
**      send edges to make edge to create edge records
**      send interior points to add_shade point to create pt records
**
***********************************************************************f*/
PRIVATE VOID
activateObjects( line )
INT4      line;
{
REG pPT4      pV0, pV1;
INT4          i, nFacets, v0, v1, yMin;
UINT4         objType, fType;
pFLT4         pPlane;
BOOL          allOut, ltFront;
pACT_REC      pObjActRec, pNextActRec;
pSHADOW_OBJ   pShadowObj;
pOBJECT       pObj;
```

```
pBITS4      pVis;
pGRAF_METH  methods;

REG pANY    pTrav = _pTrav;

pObjActRec = _objectBuckets[ line ];
   _objectBuckets[ line ] = NULL;
   while ( pObjActRec ) { pNextActRec = pObjActRec->pNext;
         pObj = pObjActRec->pObj;

if ( pObj != NULL ){
            /* its an activation record, activate obj */ pVis = _getVisArr( pObj );
            objType = pObj->bits & OBJ_TYPE_MSK;
            methods = (pGRAF_METH)_methods[ objType ];
            allOut = TRUE;

(*(methods->inquireFacets))( &nFacets, &fType, pObj->pData );
            (*(methods->transformCoord4))( _pXVtx, pObj->pData, _ltMtx );
            (*(methods->startFacetTrav))( pTrav, pObj->pData );

/* check size of the active list */
            if ( _nShadowObjs + nFacets >= _maxShadowObjs ) {
               /* realloc shadow object array */
               _maxShadowObjs = _nShadowObjs + nFacets + VB_EXTRA_SHADOW_OBJS;
               i = ( _maxShadowObjs + 1 ) * (INT4)sizeof( ppSHADOW_OBJ );
               _pShadowObjs = (ppSHADOW_OBJ)_realloc( (pANY)_pShadowObjs, i );
            }
            if ( fType & _CAST_SHADOWS ) {
               /* for each facet */
               while ( (pPlane = (*(methods->nextFacet))( pTrav )) != (pFLT4)FAIL ){
                  pShadowObj = (pSHADOW_OBJ)_poolAlloc( _objPool );
                  pShadowObj->zMin = (FLT4)INFINITY ; _yMin = 99999999; _yMax = -1

/* for each outline */
                  while ((v0 = (*(methods->nextOutlineIndx))( pTrav ))!= FAIL ) {
                     while ((v1 = (*(methods->nextVtxIndx))( pTrav ))!= FAIL ) {
                        makeEdge( _pXVtx[v0], _pXVtx[v1], pShadowObj );
                        v0 = v1;
                     }
                  }
                  if ( (yMin = _yMin) <= _maxBucket && _yMax >= 0 ) {
                     allOut = FALSE;
                     pShadowObj->yEnd = _yMax + 1;
                     pShadowObj->pPlane = pPlane;
                     pShadowObj->ltFront = (mDot3(pPlane, _ltPt)+pPlane[D]) >= (FLT
                     pShadowObj->pEdges = NULL;
                     pShadowObj->xMin = (FLT4)INFINITY;
                     pShadowObj->xMax = (FLT4)NEG_INFINITY;
                     /* Either push the shadow obj onto the active list */
                     if ( yMin <= line ) {
                        _pShadowObjs[ _nShadowObjs ] = pShadowObj ;
                        _nShadowObjs++ ;

/* Or into correct bucket */
                     } else if ( yMin <= _maxBucket ) {
#ifdef DEBUG
if ( yMin < 0 || yMin > _maxBucket )
printf( "objectBucket indx out of range\n" );
#endif
                        pShadowObj->pNext = (pSHADOW_OBJ)_objectBuckets[ yMin ];
                        _objectBuckets[ yMin ] = (pACT_REC)pShadowObj;
                     }

} else {
                     /* entire facet above or below buffer */
                     _poolFree( _objPool, (pANY)pShadowObj );
                  }
               } /* for each facet */

} else {
               /* recieves shadows only */
               pShadowObj = NULL;
            }

/* now activate the shading points */
            if (((!allOut || (fType & _CAST_SHADOWS)) && (fType & _RCV_SHADOWS )){
               /* some in and rcv shadows, activate unclipped shade points */
               if ( nFacets > 1 ) {
                  pShadowObj = NULL;
                  ltFront = TRUE;
               } else {
```

```
                (*(methods->startFacetTrav))( pTrav, pObj->pData );
                pPlane = (*(methods->nextFacet))( pTrav );
                ltFront = mDot3( _ltPt, pPlane ) + pPlane[D] >= (FLT4)0.0;
            } addShadePts ( pObj, methods, fType, ltFront, pShadowObj, _pXVtx );

} /* if some shade points in */
        _poolFree( _actPool, (pANY)pObjActRec );

} else {
        /* if p_obj is null, obj was activated during pre-process */
        pShadowObj = (pSHADOW_OBJ)pObjActRec;

/* Put the shadow obj onto the active list */
        if ( _nShadowObjs >= _maxShadowObjs ) {

/* realloc shadow object array */
            _maxShadowObjs = _nShadowObjs + VB_EXTRA_SHADOW_OBJS;
            i = (_maxShadowObjs + 1 ) * sizeof( ppSHADOW_OBJ );
            _pShadowObjs = (ppSHADOW_OBJ)_realloc( (pANY)_pShadowObjs, i );
        } ifdef DEBUG
if ( _nShadowObjs < 0 || _nShadowObjs >= _maxShadowObjs )
printf( "Shadow object index out of range\n" );
#endif
        _pShadowObjs[ _nShadowObjs ] = pShadowObj ;
        _nShadowObjs++ ;
    }
    pObjActRec = pNextActRec;

} /* end for each object */
}

/*f*********************** Private Function ******************************
**
**  FUNCTION NAME :    addShadePts
**
**      Purpose    :   add shade pt records to the buckets
**
*d----------------------------------------------------------------------
**  Description/Algorithm :
**      allocate a shade pt record and fill it.
**      clip against hither and y range.
**      mark fface off buf bit if clipped.
****************************************************************f*/
PRIVATE VOID
addShadePts ( pObj, methods, fType, ltFront, pShadowObj, pXVtx )
pOBJECT        pObj;
pGRAF_METH     methods;
BITS4          fType;
BOOL           ltFront;
pSHADOW_OBJ    pShadowObj;
pPT4           pXVtx;
{
pBITS4         pVis;
INT4           i, yInt, nMeshPts;
REG pSHADE_PT  pPt;
BITS4          vType;
pPT4           pV0;
pPLANE         pPlane;
pFLT4          pVtx, pNorm;
BOOL           inOut, noBack;
FLT4           w1;
VEC3           v0 ;

REG pANY       pTrav = _pTrav;

/* some in and rcv shadows, activate unclipped shade points */
    pVis = _getVisArr( pObj );
    pV0 = _pXVtx;
    noBack = !( fType & _BACKFACE );

(*(methods->inquireCoords))( &i, &nMeshPts, &vType, pObj->pData );
    (*(methods->startCoordTrav))( pTrav, pObj->pData );

for ( i = 0; i < nMeshPts; ++i, ++pV0 ){
        pVtx = (*(methods->nextMeshCoord))( pTrav );

/* if first pass or pt not yet valid ... */
        if ( ( _nPass == 1 || !( pVis[i] & _onBufBit) )
            && ( (*pV0)[Z] > (FLT4)0.0 )
        ){
            if ( vType & _VTX_NORMALS ) {
```

```
                pNorm = (*(methods->getNorm))( pTrav );
                if ( _projType != _PERSPECTIVE )
                    ltFront = mDot3( _ltPt, pNorm ) <= (FLT4)0.0 ;
                else
                    ltFront = ( ( (pVtx[X] - _ltPt[X]) * pNorm[X] )
                              + ( (pVtx[Y] - _ltPt[Y]) * pNorm[Y] )
                              + ( (pVtx[Z] - _ltPt[Z]) * pNorm[Z] )
                              ) <= (FLT4)0.0 ;
                )
                /* if not front and no backface, next point */
                if ( !ltFront && noBack )  continue;

w1 = (FLT4)1.0 / (*pV0)[W];
                mScaleVec3( v0, w1, *pV0 );

yInt = (INT4) v0[Y];

if ( v0[Y] >= (FLT4)0.0 && yInt <= _maxBucket ) {
                    pPt = (pSHADE_PT)_poolAlloc( _sptPool );

/* Set the on buffer bit */
                    pVis[ i ] |= _onBufBit ;

/* fill in shade point record */
                    pPt->pVis = &pVis[ i ];
                    pPt->pShadowObj = pShadowObj;
                    pPt->pWVtx = pVtx;
                    mCopyVec3( pPt->vtx, v0 );

#ifdef DEBUG
if ( yInt < 0 || yInt > _maxBucket )
printf( "Shade bucket index out of range\n" );
#endif
                    pPt->pNext = _shadeBuckets[ yInt ];
                    _shadeBuckets[ yInt ] = pPt;
                    ++(_nShadeBuckets[ yInt ]);
                }
            ) /* end not yet seen */
        ) /* for each point */
}

/*f*********************** Private Function ****************************
**
** FUNCTION NAME :    makeEdge
**
**      Purpose   :   create edge control record
**
*d------------------------------------------------------------------
** Description/Algorithm :
**      Create an edge control block for the edge, clip against y limits
**      Input points should be homogenized, w == 1
*********************************************************************f*/
PRIVATE VOID
makeEdge( v0, v1, pShadowObj )
REG    PT4       v0, v1;
pSHADOW_OBJ      pShadowObj;
{
INT4             bucket, yBotInt;
REG   FLT4       yTop, yBot, xTop, xBot, dy;
FLT4             y0, y1, w0, w1, z1;
REG   pEDGE      pEdge;

w0 = (FLT4)1.0 / v0[W];
    w1 = (FLT4)1.0 / v1[W];

y0 = v0[Y] * w0;
    y1 = v1[Y] * w1;

if ( y0 >= y1 ) {
        yBot = y0;    yTop = y1;
        xBot = v0[X] * w0;  xTop = v1[X] * w1 ;
    } else {
        yBot = y1;    yTop = y0;
        xBot = v1[X] * w1;  xTop = v0[X] * w0 ;
    }
    if ( (bucket = (INT4)yTop) > _maxBucket || yBot < (FLT4)0.0 )
        return;

yBotInt = (INT4)yBot;
    pEdge = (pEDGE)_poolAlloc ( _edgePool );
    pEdge->xTop = xTop;   pEdge->xBot = xBot;
    pEdge->yTop = yTop;   pEdge->yBot = yBot;
    pEdge->pShadowObj = pShadowObj;
    pEdge->bits = 0;
```

```
    /* do zmin for one vtx only, z1 */
    z1 = v1[Z] * w1;
    mReplaceMin( pShadowObj->zMin, z1 );
    mReplaceMax( _yMax, yBotInt );
    mReplaceMin( _yMin, bucket );

if ( (dy = yBot - yTop) != (FLT4)0.0 ) {
       if ( (pEdge->dxDy = (pEdge->xBot - pEdge->xTop)/dy) >= (FLT4)0.0 ){
          pEdge->bits = XINC;
       }
    } else {
       pEdge->dxDy = (FLT4)0.0;
       if ( pEdge->xBot > pEdge->xTop )
          pEdge->bits = XINC;
    } if ( bucket > 0 || yTop >= (FLT4)0.0 ) {
       pEdge->curXTop = pEdge->xTop;
    } else {
       /* top of line above buffer, intersect line with y = 0 */
       bucket = 0;
       pEdge->curXTop = pEdge->xTop - yTop * pEdge->dxDy;
    }

++bucket;
    if ( yBotInt < bucket ) {
       /* both endpoints within single scan line */
       pEdge->curXBot = pEdge->xBot;
       pEdge->bits |= DELETE;
    } else {
       /* else intersect with next scan line */
       pEdge->curXBot = pEdge->xTop - (yTop - (FLT4)bucket) * pEdge->dxDy;
    } ifdef DEBUG
    if ( (bucket-1) < 0 || (bucket-1) > _maxBucket )
       printf( "edge bucket out of range, bucket = %d\n", bucket-1 );
#endif
    pEdge->pNext = _edgeBuckets[ --bucket ];
    _edgeBuckets[ bucket ] = pEdge;
}

/*f************************** Private Function *******************************
**
**  FUNCTION NAME :     updateEdges
**
**      Purpose   :     prepare edges of active objects for next slab
**
*d----------------------------------------------------------------------------
**  Description/Algorithm :
**      if objects have expired, delete object & its edges
**      if edge is flagged for deletion, delete it.
**      update the curX value of all remaining edges.
**      if edge expires this scan line, flag it for deletion next round.
**      add new edges to their respective objects.
**      prepares span between line & line+1
**
******************************************************************************f*/
PRIVATE VOID
updateEdges ( line )
INT4    line;
{
REG     FLT4            min, max ;
REG     pEDGE           pEdge ;
REG     pSHADOW_OBJ     pActObj;
pEDGE                   pLast, pNext ;
INT4                    i ;
BOOL                    computeFlag;

/* Only compute x extents if we will have shade points */
    computeFlag = ( _nShadeBuckets[ line ] > 0 ) ;

/* for each active object */
    for ( i = 0 ; i < _nShadowObjs ; ++i ) {
       pActObj = _pShadowObjs[ i ] ;

/* check and delete object */
       if ( pActObj->yEnd <= line ) {
          deleteActObj( i-- );

} else {
          pEdge = pActObj->pEdges ; pLast = NULL;
          min   = (FLT4)INFINITY ;  max = (FLT4)NEG_INFINITY ;
```

```
            /* for each active edge of the object */
            while ( pEdge ) {

/* check if its flagged for deletion */
                if ( pEdge->bits & DELETE ) {
                    if ( !pLast ) {
                        pActObj->pEdges = pEdge->pNext;
                        _poolFree( _edgePool, (pANY)pEdge );
                        pEdge = pActObj->pEdges;

} else {
                        pLast->pNext = pEdge->pNext;
                        _poolFree( _edgePool, (pANY)pEdge );
                        pEdge = pLast->pNext;
                    }
                    continue; /* with next edge */

} else {
                    /* if not deleted, update vals */
                    pEdge->curXTop = pEdge->curXBot;
                    if ( pEdge->yBot < (FLT4)(line + 1) ) {

/* line ends on this scan, flag for deletion next line */
                        pEdge->curXBot = pEdge->xBot;
                        pEdge->bits |= DELETE;

/* otherwise bump the current x value by dxdy */
                    } else {
                        pEdge->curXBot += pEdge->dxDy;
                    }
                } /* else update vals */ if ( computeFlag ) {
                    if ( pEdge->bits & XINC ) {
                        mReplaceMin( min, pEdge->curXTop );
                        mReplaceMax( max, pEdge->curXBot );
                    } else {
                        mReplaceMin( min, pEdge->curXBot );
                        mReplaceMax( max, pEdge->curXTop );
                    }
                }
                pLast = pEdge ;
                pEdge = pEdge->pNext;

} /* while active edges */ pActObj->xMin = min ;
            pActObj->xMax = max;

} /* else obj still active */
    } /* while active objects */

/* add new edges, push onto objects edge list */
    pEdge = _edgeBuckets[ line ];
    while ( pEdge ) {
        pActObj = pEdge->pShadowObj;

if ( computeFlag ) {
            if ( pEdge->bits & XINC ) {
                mReplaceMin( pActObj->xMin, pEdge->curXTop );
                mReplaceMax( pActObj->xMax, pEdge->curXBot );
            } else {
                mReplaceMin( pActObj->xMin, pEdge->curXBot );
                mReplaceMax( pActObj->xMax, pEdge->curXTop );
            }
        }
        pNext = pEdge->pNext;
        pEdge->pNext = pActObj->pEdges;
        pActObj->pEdges = pEdge;
        pEdge = pNext;
    }
    _edgeBuckets[ line ] = NULL;
}

/*f*********************** Private Function *****************************
**
** FUNCTION NAME :     sortShadePts
**
**     Purpose    :    sort the shade point list into ascending x order
**
*d----------------------------------------------------------------------
** Description/Algorithm
**     Sort the vertex array into increasing x order.
**     Quick sort w/ tail recursion removed.
*************************************************************************f*/
PRIVATE VOID
```

```
sortShadePts ( line )
INT4    line;
{
INT4            sp, nPts;
INT4            stack[ 100 ];
REG  INT4       i, j, l, r;
REG  FLT4       x;
REG  pSHADE_PT  pPt, pNextPt ;
REG  ppSHADE_PT pShadeArr;

if ( (nPts - _nShadeBuckets[ line ]) >= _maxShadePts ) {
        /* realloc shade pt array */
        _maxShadePts = nPts + VB_EXTRA_SHADE_PTS;
        i = (_maxShadePts + 1) * (INT4)sizeof( ppSHADE_PT );
        _pShadePts = (ppSHADE_PT)_realloc( (pANY)_pShadePts, i );
    }

/* put into the array */
    pPt = _shadeBuckets[ line ];
    pShadeArr = _pShadePts;
    while ( pPt ) {
        *pShadeArr++ = pPt;
        pNextPt = pPt->pNext;
        pPt->pNext = NULL ;
        pPt = pNextPt ;
    }

_nShadeBuckets[ line ] = 0;
    _shadeBuckets[ line ] = NULL;

pShadeArr = _pShadePts;

/* quickSort, use an explicit stack, not recursion */
    l = 0;
    r = nPts - 1;
    sp = 2;

mRepeat {
        if ( ( r-l ) <= 8 ) {
            sp -= 2;
            l = stack[ sp ]; r = stack[ sp+1 ];

} else {
            /* i = partition ( l, r ) */
            x = pShadeArr[ r ]->vtx[X];
            i = l-1; j = r;

mRepeat {
                while( pShadeArr[ ++i ]->vtx[X] < x ) NULL_STMT;
                while( j && pShadeArr[ --j ]->vtx[X] > x ) NULL_STMT;

pPt = pShadeArr[ i ];
                pShadeArr[ i ] = pShadeArr[ j ];
                pShadeArr[ j ] = pPt;

} mUntil( j <= i );

pShadeArr[ j ] = pShadeArr[ i ];
            pShadeArr[ i ] = pShadeArr[ r ];
            pShadeArr[ r ] = pPt;

/* push largest on the stack */
            if ( ( i - l ) > ( r - i ) ) {
                stack[ sp ] = l;
                stack[ sp+1 ] = j;
                l = i+1;
            } else {
                stack[ sp ] = i+1;
                stack[ sp+1 ] = r;
                r = j;
            }
            sp += 2;
        }

} mUntil( sp == 0 );

/* Above is almost sorted.  Now insert them until they are */
    for ( i = 1 ; i < nPts ; i++ ) {
        pPt = pShadeArr[ i ] ;
        x = pPt->vtx[X];
        j = i - 1;
        while( ( j >= 0 ) && ( x < pShadeArr[ j ]->vtx[X] ) ) {
            pShadeArr[ j+1 ] = pShadeArr[ j ] ;
            j-- ;
```

```
            }
            pShadeArr[ j+1 ] = pPt ;
        }

/* find the duplicate vertices, remove dups from array */
        /* >>>>>>>> this algorithm finds most but not all dups */
        pPt = pShadeArr[ 0 ];
        for ( i =0, j = 1; j < nPts; ) {
            if ( ( pPt->vtx[X] == pShadeArr[ j ]->vtx[X] )
                &&( pPt->vtx[Y] == pShadeArr[ j ]->vtx[Y] )
                &&( pPt->vtx[Z] == pShadeArr[ j ]->vtx[Z] )
            ){
                /* dup, push onto next stack of pPt */
                pShadeArr[j]->pNext = pPt->pNext ;
                pPt->pNext = pShadeArr[ j++ ];
            } else {
                /* no dup , compress list, get next element */
                pShadeArr[ ++i ] = pShadeArr[ j++ ] ;
                pPt = pShadeArr[ i ] ;
            }
        }
    _nShadePts = i + 1 ;

#ifdef DEBUG
    /* check the sorted list for correctness */
    for ( j = 0; j < i; ++j ) {
        if ( pShadeArr[ j ]->vtx[X] > pShadeArr[ j+1 ]->vtx[X] )
            printf( "shade point array out of order" );
    }
#endif
}

/*f*********************** Private Function ***************************
**
** FUNCTION NAME :    sortActiveObj
**
**     Purpose   :    sort the active object list into ascending xmin order.
**
*d----------------------------------------------------------------------
** Description/Algorithm
**     Sort the object array into increasing xmin order.
**     Shell sort
***********************************************************************f*/
PRIVATE VOID
sortActiveObj()
{
REG     INT4              i, j, h;
REG     FLT4              x;
REG     pSHADOW_OBJ       pObj ;
REG     ppSHADOW_OBJ      pObjArr;
INT4                      nObjs;

/* List is usually almost sorted. Now sort them until they are */
    pObjArr = _pShadowObjs ;
    nObjs = _nShadowObjs ;

h = 1 ;
    mRepeat( h = 3*h + 1 ; ) mUntil( h > nObjs ) ;

mRepeat ( h /= 3 ;
        for ( i = h ; i < nObjs ; i++ ) {
            pObj = pObjArr[ i ] ;
            x = pObj->xMin ;
            j = i ;
            while ( pObjArr[ j-h ]->xMin > x ) {
                pObjArr[ j ] = pObjArr[ j - h ] ;
                j -= h ;
                if ( j < h ) break ;
            }
            pObjArr[ j ] = pObj ;
        }
    ) mUntil( h == 1 ) ;

#ifdef DEBUG
    /* check the sorted list for correctness */
    for ( i = 0; i < nObjs - 1; ++i ) {
        if ( pObjArr[ i ]->xMin > pObjArr[ i+1 ]->xMin )
            printf( "object array out of order" );
    }
#endif

}

/*f*********************** Private Function ***************************
```

```
**
** FUNCTION NAME :    hid
**
**     Purpose   :    polygon in/out test
**
*d--------------------------------------------------------------
** Description/Algorithm :
**     Do an in out test of the object for the given vtx. Use only the
**     active edges. Count +x crossings.
**
*****************************************************************f*/
PRIVATE BOOL
hid ( pShadowObj, pPt )
pSHADOW_OBJ    pShadowObj;
pSHADE_PT      pPt ;
(
INT4           crossings;
REG  FLT4      x, y, y0;
REG  pEDGE     pEdge;
REG  BOOL      pos0, pos1;

crossings = 0;
    x = pPt->vtx[X];
    y = pPt->vtx[Y];

pEdge = pShadowObj->pEdges;
    while ( pEdge ) {
       pos1 = pEdge->curXBot > x;
       if ( (pos0 = pEdge->curXTop > x) || pos1 ) {
          /* at least one x positive */
          y0 = pEdge->yTop - y;

if ( (y0 < (FLT4)0.0) != (pEdge->yBot < y) ){
             /* crosses vtx y */
             if ( (pos0 && pos1)       /* both positive */
                ||(( pEdge->xTop - y0 * pEdge->dxDy) > x )
             ){
                ++crossings;
             }
          }
       }
       pEdge = pEdge->pNext;
    } return( (BOOL)(crossings & 1 ));
}

/*f********************** Private Function ****************************
**
** FUNCTION NAME :    deleteActObj
**
**     Purpose   :    utility to delete objects & dependent edges
**
*d--------------------------------------------------------------
** Description/Algorithm :
**     Delete remaining active edges and object
*****************************************************************f*/
PRIVATE VOID
deleteActObj ( i )
INT4      i;
(
REG  pSHADOW_OBJ   pObj;
REG  pEDGE         pEdge, pNextEdge;

/* Object is */
    pObj = _pShadowObjs[ i ] ;

/* delete edges */
    pEdge = pObj->pEdges;
    while( pEdge ) {
       pNextEdge = pEdge->pNext;
       _poolFree ( _edgePool, (pANY)pEdge );
       pEdge = pNextEdge;
    }
    _poolFree ( _objPool, (pANY)pObj );

_nShadowObjs-- ;
    _pShadowObjs[ i ] = _pShadowObjs[ _nShadowObjs ] ;

}

/*f********************** Private Function ****************************
**
** FUNCTION NAME :    freeShadePts
**
**     Purpose   :    free shade pt array and duplicates
**
```

```
/****************************************************************f*/
PRIVATE VOID
freeShadePts( )
{
 REG    pSHADE_PT    pPt, pNextPt ;
 REG    INT4         i;
 REG    POOLID       id ;
 REG    ppSHADE_PT   pPts ;

if ( ( i = _nShadePts ) > 0 ) {
       id = _sptPool ;
       pPts = _pShadePts ;

for ( ; i-- ; ) {
          pPt = pPts[ i ];
          while ( pPt ) {
             pNextPt = pPt->pNext ;
             _poolFree ( id, (pANY)pPt );
             pPt = pNextPt ;
          }
       }
    }
}

/****************************** the end ******************************/
```

We claim:

1. In a computer graphics renderer, a method for shading and displaying a three dimensional scene as a function of visibility of points on surfaces of objects in the three dimensional scene from a common point, such as a common point on a light source, comprising the steps of:

a) preparing a two dimensional projection of the objects in the scene, including the points on the surfaces of the objects, from the common point, each object and point in the projection defining a projected object and projected point, respectively;

b) superimposing a plurality of substantially parallel boundaries onto the projection, there being a space between each pair of immediately adjacent boundaries, each space defining a scan area, each scan area having a substantially uniform width determined by the size of the space between adjacent boundaries, there being a plurality of scan areas superimposed onto the projection;

c) determining whether any projected points within each scan area are obscured from the common point by any projected object within the same scan area and identifying the projected points determined to be so obscured;

d) recording the visibility of the projected points based upon the result of step (c) in a register;

e) shading the three dimensional scene as a function of the recorded visibility of the projected points; and, f) displaying the shaded scene on a video display device associated with the graphics renderer.

2. A method according to claim 1 wherein each projected object has edges, and step (c) comprises determining, for each scan area, whether any two edges of one projected object bracket one or more projected points on a projected object, identifying projected points bracketed by such edges as potentially shadowed points and identifying projected objects having such edges as potential shadowers of the potentially shadowed points, and defining potential shadowers that actually obscure potentially shadowed points from the common point as actual shadowers of the potentially shadowed points.

3. A method according to claim 2 wherein step (c) is performed by determining only whether any of the potentially shadowed points are actually obscured from the common point by any of the potential shadowers, whereby visibility of projected points is determined without testing all projected points against all other projected objects.

4. A method according to claim 2 wherein step (c) comprises:

(i) selecting one of the potentially shadowed points; and, (ii) identifying the potential shadower on which the selected point is disposed and eliminating the so identified potential shadower as an actual shadower of the selected point.

5. A method according to claim 2 wherein step (c) comprises:

(i) selecting one of the potentially shadowed points;

(ii) identifying a projected point on each potential shadower of the selected point that is the closest to the common point than any other projected point on each such potential shadower;

(iii) determining, for each potential shadower of the selected point, whether the projected point identified in step (ii) is closer to or farther away from the common point than the selected point; and, (iv) eliminating, as an actual shadower of the selected point, each potential shadower whose projected point identified in step (ii) is determined to be farther away from the common point than the selected point.

6. A method according to claim 2 wherein each potential shadower lies in a plane defined by the plane equation $Ax+By+Cz+D=0$, where A, B, C and D are constants and x, y and z are coordinates of points in the plane, and further wherein each potential shadower has a light side facing the common point and a dark side facing away from the common point, and step (c) comprises:

(i) selecting one of the potentially shadowed points;

(ii) determining, for each potential shadower of the selected point, based upon the plane equation and coordinates of the selected point, whether the selected point is disposed on the light side or dark side of the potential shadower; and (iii) eliminating the potential shadower as an actual shadower of the selected point if it is determined that the selected point is disposed on the light side of the potential shadower.

7. A method according to claim 2 wherein step (c) comprises:

(i) selecting one of the potentially shadowed points;

(ii) defining a ray in the two dimensional projection from the selected point to a location outside of a selected one of the potential shadowers of the selected point;

(iii) determining whether the ray intersects the edges of the selected potential shadower an even or odd number of times; and, (iv) eliminating the selected potential shadower as an actual shadower of the selected point if the ray intersects an even number of times.

8. A method according to claim 1 wherein a predetermined number of scan areas is overlaid on the projection, and step (b) comprises:

(i) determining the total number of projected objects;

(ii) selecting an average number of projected objects to be overlaid by each scan area where said average number of projected objects is less than the total number of projected objects;

(iii) dividing the total number of projected objects by the average number of projected objects to be overlaid by each scan area; and, (iv) selecting both the width of each scan area and the predetermined number of scan areas to be overlaid on the projection based upon the result of the division.

9. A method according to claim 1 wherein a predetermined number of scan areas is overlaid on the projection and step (b) comprises:

(i) determining the total number of projected objects and dividing the total number of projected objects by a first predetermined quantity to arrive at a first estimate of the predetermined number of scan areas to be overlaid on the projection where the first predetermined quantity is less than the total number of projected objects;

(ii) dividing the total number of projected points by a second predetermined quantity to arrive at a second estimate of the predetermined number of scan areas to be overlaid on the projection, the magnitude of the second predetermined quantity being substantially greater than the magnitude of the first predetermined quantity and less than the total number of projected points;

(iii) selecting whichever one of the first and second estimates has the greatest magnitude; and (iv) selecting both the width of each scan area and the predetermined number of scan areas to be overlaid on the projection based upon the estimate selected in step (iii).

10. A method according to claim 1 wherein step (b) comprises:

(i) preliminarily assigning a number of scan areas, each of a preliminary width, to overlay the projected objects;

(ii) selecting a scan area and determining, for the selected scan area, whether the number of projected objects in the selected scan area exceeds a preassigned threshold;

(iii) dividing the selected scan area into a plurality of scan areas of smaller width than the preliminary width if the number of projected objects in the selected scan area exceeds the preassigned threshold;

(iv) comparing the number of projected objects in each scan area of smaller width against the preassigned threshold; and, (v) repeating steps (iii) and (iv) for the selected scan area until the number of projected objects in each scan area of smaller width does not exceed the preassigned threshold.

11. A method according to claim 1 further comprising the step of providing a register with an assignable number of memory locations and wherein step (b) comprises:

(i) assigning a number of memory locations to the register and preliminarily assigning an equal number of scan areas each of a preliminary width to overlay the projection, there being memory locations corresponding to each scan area;

(ii) successively scanning the scan areas to encounter projected objects overlaid thereby, and detecting whether new projected objects are encountered during each scan;

(iii) storing in the register an identification of each projected object that is newly encountered during scanning, each identification being stored in one of the memory locations corresponding to the scan area in which the object was newly encountered;

(iv) traversing the memory locations of the register, maintaining a count of the number of identifications stored therein and comparing the count to a threshold;

(v) reassigning the number and width of scan areas preliminarily assigned in step (i) when the count is at least substantially equal to the threshold by redefining boundaries of plural ones of adjacent scan areas to define a new single scan area having a greater width than the preliminary width, the new single scan area overlaying all of the projected objects whose identifications were counted to reach the threshold; and, (vi) repeating steps (iv) and (v) for all scan areas succeeding the newly defined single scan area.

12. In a computer graphics renderer, a method for shading and displaying a three dimensional scene as a function of visibility of points on surfaces of objects in the three dimensional scene from a common point, such as a common point on a light source, comprising the steps of:

a) preparing a two dimensional projection of the objects in the scene, including the points on the surfaces of the objects and edges of the objects, from a point of view of the common point, each object and point in the projection defining a projected object and a projected point, respectively, each projected point having a coordinate associated therewith for indicating a position thereof relative to other projected points and relative to the common point;

b) superimposing a plurality of substantially parallel boundaries onto the projection, there being a spaced between each pair of immediately adjacent boundaries, each space defining a scan area, each scan area having a substantially uniform width determined by the size of the space between adjacent boundaries, there being a plurality of scan areas superimposed onto the projection;

c) determining for each scan area, based upon the coordinates of the projected points, whether any two edges of one projected object bracket one or more projected points on a projected object, identifying projected points bracketed by such edges as potentially shadowed points and identifying projected objects having such edges as potential shadowers of the potentially shadowed points;

d) testing only the potentially shadowed points against only potential shadowers of the potentially shadowed points to determine, based on the coordinates of the potentially shadowed points, whether any of the potentially shadowed points are actually obscured from the common point by any of the potential shadowers; and, e) recording the visibility of the potentially shadowed points based upon the result of step (d) in a register, and defining potential shadowers that actually obscure potentially shadowed points from the common point as actual shadowers of the potentially shadowed points;

whereby visibility of projected points is determined without testing all projected points against all other projected objects;

f) shading the three dimensional scene as a function of the recorded visibility of the projected points; and, g) displaying the shaded scene on a video display device associated with the graphics renderer.

13. A method according to claim 12 wherein step (d) comprises:
(i) selecting one of the potentially shadowed points; and,
(ii) identifying the potential shadower on which the selected point is disposed and eliminating the so identified potential shadower as an actual shadower of the selected point.

14. A method according to claim 12 wherein step (d) comprises:
(i) selecting one of the potentially shadowed points;
(ii) identifying a projected point on each potential shadower of the selected point that is closer to the common point than any other projected point on each such potential shadower;
(iii) determining, for each potential shadower of the selected point, whether the projected point identified in step (ii) is closer to or farther away from the common point than the selected point; and,
(iv) eliminating as an actual shadower of the selected point each potential shadower whose projected point identified in step (ii) is determined to be farther away from the common point than the selected point.

15. A method according to claim 12 wherein each potential shadower lies in a plane defined by the plane equation $Ax+By+Cz+D=0$, where A, B, C and D are constants and x, y and z are coordinates of points in the plane, and further wherein each potential shadower has a light side facing the common point and a dark side facing away from the common point, and step (d) comprises:
(i) selecting one of the potentially shadowed points;
(ii) determining, for each potential shadower of the selected point, based upon the plane equation and coordinates of the selected point, whether the selected point is disposed on the light side or dark side of the potential shadower; and,
(iii) eliminating the potential shadower as an actual shadower of the selected point if it is determined that the selected point is disposed on the light side of the potential shadower.

16. A method according to claim 12 wherein step (d) comprises:
(i) selecting one of the potentially shadowed points;
(ii) defining a ray in the two dimensional projection from the selected point to a location outside of a selected one of the potential shadowers of the selected point;
(iii) determining whether the ray intersects the edges of the selected potential shadower an even or odd number of times; and,
(iv) eliminating the selected potential shadower as an actual shadower of the selected point if the ray intersects an even number of times.

17. A method according to claim 12 wherein the scan areas are traversed in successive order and the determination of step (d) is performed on a scan area by scan area basis.

18. A method according to claim 17 further comprising the steps of:
(i) providing a first register with a plurality of memory locations, there being memory locations corresponding to each scan area;
(ii) successively scanning the scan areas to encounter projected objects overlaid thereby and detecting whether new projected objects are encountered during each scan;
(iii) storing in the first register an identification of each projected object that is newly encountered during scanning, each identification being stored in one of the memory locations corresponding to the scan area in which the projected object was newly encountered, the identifications being stored in an order corresponding to the order of encounter of the projected objects; and,
(iv) employing the contents of the first register to determine whether any newly encountered projected objects should be taken into account when performing step (d) for a particular scan area.

19. A method according to claim 18 further comprising the steps of:
(i) providing a second register for storing an identification of all projected objects that should be taken into account when performing step (d);
(ii) updating the second register with the contents of the first register as each scan area is scanned; and,
(iii) deleting from the second register the identification of any projected object that is no longer encountered as each scan area is scanned.

20. A method according to claim 19 wherein the second register stores coordinates of the projected objects that should be taken into account when performing step (d), including coordinates indicative of edges of such projected objects.

21. A method according to claim 19 further comprising the steps of:
providing a third register for storing the coordinates of potentially shadowed points encountered during a scan of a scan area;
clearing the third register prior to initiating a scan of a scan area;
storing in the third register the coordinates of the potentially shadowed points encountered during a scan of a scan area in an order corresponding to the order in which the potentially shadowed points are encountered during the scan;
employing the contents of at least the second and third registers to perform step (d).

22. A method according to claim 19 wherein the second register stores coordinates of the projected objects that should be taken into account when performing step (d), including coordinates indicative of edges of such projected objects, further comprising the steps of:
  (i) providing a third register for storing the coordinates of potentially shadowed points encountered during a scan of a scan area;
  (ii) clearing the third register prior to initiating a scan of a scan area;
  (iii) storing in the third register the coordinates of the potentially shadowed points encountered during a scan of a scan area in an order corresponding to the order in which the potentially shadowed points are encountered during the scan; and
  (iv) sorting the coordinates stored in the second register to correspond to an order in which the edges of the projected objects appear in the scan area scanned in the immediately preceding step (iii);
wherein step (c) comprises:
  (i) sequentially selecting from the third register, in order of storage therein, coordinates of each of the potentially shadowed points; and,
  (ii) comparing the selected coordinates of each potentially shadowed point against a selected one of the stored coordinates of the projected object edges stored in the second register, to obtain the identification of the potential shadowers of each potentially shadowed point;
and wherein step (d) comprises:
  (i) sequentially selecting each potentially shadowed point, in order of storage of their respective coordinates in the third register;
  (ii) comparing the selected point against each of its potential shadowers until an actual shadower of the potentially shadowed point is found; and,
  (iii) testing the next selected point in sequence against the actual shadower found in the immediately preceding step (ii) before testing against any other potential shadowers.

23. A method according to claim 12 wherein a predetermined number of scan areas is overlaid on the projection, and step (b) comprises:
  (i) determining the total number of projected objects;
  (ii) selecting an average number of projected objects to be overlaid by each scan area where said average number of projected objects is less than the total number of projected objects;
  (iii) dividing the total number of projected objects by the average number of projected objects to be overlaid by each scan area; and,
  (iv) selecting both the width of each scan area and the predetermined number of scan areas to be overlaid on the projection based upon the result of the division.

24. A method according to claim 23 wherein the selected average number of projections of objects to be overlaid by each scan area is in the range of about 100 to 400 provided that the total number of projected objects is greater than the average number.

25. A method according to claim 12 wherein a predetermined number of scan areas is overlaid on the projection and step (b) comprises:
  (i) determining the total number of projected objects and dividing the total number of projected objects by a first predetermined quantity to arrive at a first estimate of the predetermined number of scan areas to be overlaid on the projection where the first predetermined quantity is less than the total number of projected objects;
  (ii) dividing the total number of projected points by a second predetermined quantity to arrive at a second estimate of the predetermined number of scan areas to be overlaid on the projections, the magnitude of the second predetermined quantity being substantially greater than the magnitude of the first predetermined quantity and less than the total number of projected points;
  (iii) selecting whichever one of the first and second estimates has the greatest magnitude; and,
  (iv) selecting both the width of each scan area and the predetermined number of scan areas to be overlaid on the projection based upon the estimate selected in step (iii).

26. A method according to claim 25 wherein the magnitude of the first predetermined quantity is about 40 and the magnitude of the second predetermined quantity is about 200 provided that the first and second predetermined quantities are less than the total number of projected objects and projected points, respectively.

27. A method according to claim 12 wherein step (b) comprises:
  (i) preliminarily assigning a number of scan areas, each of a preliminary width, to overlay the projected objects;
  (ii) selecting a scan area and determining, for the selected scan area, whether the number of projected objects in the selected scan area exceeds a preassigned threshold;
  (iii) dividing the selected scan area into a plurality of scan areas of smaller width than the preliminary width if the number of projected objects in the selected scan area exceeds the preassigned threshold;
  (iv) comparing the number of projected objects in each scan area of smaller width against the preassigned threshold; and,
  (v) repeating steps (iii) and (iv) for the selected scan area until the number of projected objects in each scan area of smaller width does not exceed the preassigned threshold.

28. A method according to claim 27 wherein in the number of scan areas preliminarily assigned in step (i) is about 50.

29. A method according to claim 27 wherein the preassigned threshold is about 200.

30. A method according to claim 12 further comprising the step of providing a register with an assignable number of memory locations and wherein step (b) comprises:
  (i) assigning a number of memory locations to the register and preliminarily assigning an equal number of scan areas each of a preliminary width to overlay the projection, there being memory locations corresponding to each scan area;
  (ii) successively scanning the scan areas to encounter projected objects overlaid thereby, and detecting whether new projected objects are encountered during each scan;
  (iii) storing in the register an identification of each projected object that is newly encountered during scanning, each identification being stored in one of the memory locations corresponding to the scan area in which the object was newly encountered;
  (iv) traversing the memory locations of the register, maintaining a count of the number of identifications stored therein and comparing the count to a threshold;
  (v) reassigning the number and width of scan areas preliminarily assigned in step (i) when the count is at least substantially equal to the threshold by redefining boundaries of plural ones of adjacent scan areas to define a new single scan area having a greater width than the preliminary width, the new single scan area overlaying all of the projected objects whose identifications were counted to reach the threshold; and, (vi) repeating steps (iv) and (v) for all scan areas succeeding the newly defined single scan area.

31. A method according to claim 30 wherein the number of memory locations assigned in step (i) is about 10,000.

32. A method according to claim 30 wherein the threshold is about 200.

33. In a computer graphics renderer, a method for shading and displaying a three dimensional scene as a function of visibility of points on surfaces of objects in the three dimensional scene from a common point, such as a common point on a light source, comprising the steps of:

a) preparing a two dimensional projection of the objects in the scene, including the points on the surfaces of the objects and edges of the objects, from a point of view of the common point, each object and point in the projection defining a projected object and a projected point, respectively, each projected point having a coordinate associated therewith for indicating a position thereof relative to other projected points and relative to the common point;

b) superimposing a plurality of substantially parallel boundaries onto the projection, there being a space between each pair of immediately adjacent boundaries, each space defining a scan area, each scan area having a substantially uniform width determined by the size of the space between adjacent boundaries, there being a plurality of scan areas superimposed onto the projection;

c) determining for each scan area, based upon the coordinates of the projected points, whether any two edges of one projected object bracket one or more projected points on a projected object, identifying projected points bracketed by such edges as potentially shadowed points and identifying projected objects having such edges as potential shadowers of the potentially shadowed points;

d) testing only the potentially shadowed points against only potential shadowers of the potentially shadowed points to determine, based on the coordinates of the potentially shadowed points, whether any of the potentially shadowed points are actually obscured from the common point by any of the potential shadowers, defining potential shadowers that actually obscure potentially shadowed points from the common point as actual shadowers of the potentially shadowed points, the testing employing at least the following steps:

I. (i) selecting one of the potentially shadowed points;

(ii) identifying the potential shadower on which the selected point is disposed and eliminating the so identified potential shadower as an actual shadower of the selected point; and, (iii) repeating I (i) and (I) (ii) for all other potentially shadowed points then proceeding to II below;

II. (i) selecting one of the potentially shadowed points;

(ii) identifying a projected point on each potential shadower of the point selected in II (i) that is closer to the common point than any other projected point on each such potential shadower;

(iii) determining, for each potential shadower of the point selected in II (i) not eliminated in I, whether the projected point identified in II (ii) is closer to or farther away from the common point than the point selected in II (i);

(iv) eliminating as an actual shadower of the point selected in II (i) each such potential shadower whose projected point identified in II (ii) is determined to be farther away from the common point than the point selected in II (i); and, (v) repeating II (i) through II (iv) for all other potentially shadowed points then proceeding to III below;

III. (i) selecting one of the potentially shadowed points, each potential shadower lying in a plane defined by the plane equation $Ax+By+Cz+D=0$, where A, B, C and D are constants and x, y and z are coordinates of points in the plane, each potential shadower having a light side facing the common point and a dark side facing away from the common point;

(ii) determining, for each potential shadower of the point selected in III (i) not eliminated in I and II, based upon the plane equation and the coordinates of the point selected in III (i), whether the point selected in III (i) is disposed on the light side or dark side of the potential shadower;

(iii) eliminating the potential shadower as an actual shadower of the point selected in III (i) if it is determined that the point selected in III (i) is disposed on the light side of the potential shadower; and, (iv) repeating III (i) through III (iii) for all other potentially shadowed points then proceeding to IV below;

IV (i) selecting one of the potentially shadowed points;

(ii) defining a ray in the two dimensional projection from the point selected in IV (i) to a location outside of a selected one of the potential shadowers of the point selected in IV (i) not eliminated in I, II and III;

(iii) determining whether the ray intersects the edges of the potential shadower selected in IV (ii) an even or odd number of times;

(iv) eliminating the potential shadower selected in IV (ii) as an actual shadower of the point selected in IV (i) if the ray intersects an even number of times; and, (v) repeating IV (i) through IV (iv) for all other potentially shadowed points; and, (e) recording the visibility of the potentially shadowed points based upon the result of step (d) in a register;

whereby visibility of projected points is determined without testing all projected points against all other projected objects;

f) shading the three dimensional scene as a function of the recorded visibility of the projected points; and, g) displaying the shaded scene on a video display device associated with the graphics renderer.

34. A method according to claim 33 wherein a predetermined number of scan areas is overlaid on the projection and step (b) comprises:

(i) determining the total number of projected objects;

(ii) selecting an average number of projected objects to be overlaid by each scan area where said average number of projected objects is less than the total number of projected objects;

(iii) dividing the total number of projected objects by the average number of projected objects to be overlaid by each scan area; and, (iv) selecting both the width of each scan area and the predetermined number of scan areas to be overlaid on the projection based upon the result of the division.

35. A method according to claim 33 wherein a predetermined number of scan areas is overlaid on the projection and step (b) comprises:

(i) determining the total number of projected objects and dividing the total number of projected objects by a first predetermined quantity to arrive at a first estimate of the predetermined number of scan areas to be overlaid on the projection where the first predetermined quantity is less than the total number of projected objects;

(ii) dividing the total number of projected points by a second predetermined quantity to arrive at a second estimate of the predetermined number of scan areas to be overlaid on the projection, the magnitude of the second predetermined quantity being substantially greater than the magnitude of the first predetermined quantity and less than the total number of projected points;

(iii) selecting whichever one of the first and second estimates has the greatest magnitude; and, (iv) selecting both the width of each scan area and the predetermined number of scan areas to be overlaid on the projection based upon the estimate selected in step (iii).

36. A method according to claim 33 wherein step (b) comprises:

(i) preliminarily assigning a number of scan areas, each of a preliminary width, to overlay the projected objects;

(ii) selecting a scan area and determining, for the selected scan area, whether the number of projected objects in the selected scan area exceeds a preassigned threshold;

(iii) dividing the selected scan area into a plurality of scan areas of smaller width than the preliminary width if the number of projected objects in the selected scan area exceeds the preassigned threshold;

(iv) comparing the number of projected objects in each scan area of smaller width against the preassigned threshold; and, (v) repeating steps (iii) and (iv) for the selected scan area until the number of projected objects in each scan area of smaller width does not exceed the preassigned threshold.

37. A method according to claim 33 further comprising the step of providing a register with an assignable number of memory locations and wherein step (b) comprises:

(i) assigning a number of memory locations to the register and preliminarily assigning an equal number of scan areas each of a preliminary width to overlay the projection, there being memory locations corresponding to each scan area;

(ii) successively scanning the scan areas to encounter projected objects overlaid thereby, and detecting whether new projected objects are encountered during each scan;

(iii) storing in the register an identification of each projected object that is newly encountered during scanning, each identification being stored in one of the memory locations corresponding to the scan area in which the object was newly encountered;

(iv) traversing the memory locations of the register, maintaining a count of the number of identifications stored therein and comparing the count to a threshold;

(v) reassigning the number and width of scan areas preliminarily assigned in step (i) when the count is at least substantially equal to the threshold by redefining boundaries of plural ones of adjacent scan areas to define a new single scan area having a greater width than the preliminary width, the new single scan area overlaying all of the projected objects whose identifications were counted to reach the threshold; and, (vi) repeating steps (iv) and (v) for all scan areas succeeding the newly defined single scan area.

* * * * *